US005740321A

United States Patent [19]

Huffmann et al.

[11] Patent Number: 5,740,321

[45] Date of Patent: Apr. 14, 1998

[54] BEHAVIORAL BASED ENVIRONMENTAL SYSTEM AND METHOD FOR AN INTERACTIVE PLAYGROUND

[75] Inventors: Bradley L. Huffmann, Chandler, Ariz.; Victor H. Lang, Ft. Collins, Colo.

[73] Assignee: Semborg Recrob, Corp., Fort Collins, Colo.

[21] Appl. No.: 348,363

[22] Filed: Nov. 30, 1994

[51] Int. Cl.[6] .............................. G06F 9/44; G06F 15/18

[52] U.S. Cl. .............................. 395/10; 395/51; 395/75

[58] Field of Search .............................. 395/10, 3, 51, 395/61, 75, 76

[56] References Cited

U.S. PATENT DOCUMENTS

| | | | |
|---|---|---|---|
| 4,176,395 | 11/1979 | Evelyn-Veere | 364/420 |
| 4,434,460 | 2/1984 | Drakenborn | 364/200 |
| 4,754,410 | 6/1988 | Leech | 364/513 |
| 4,959,799 | 9/1990 | Yoshiura | 364/513 |
| 5,027,305 | 6/1991 | Tanaka | 364/513 |
| 5,081,707 | 1/1992 | Schorman | 455/186 |
| 5,165,011 | 11/1992 | Hisano | 395/54 |
| 5,167,012 | 11/1992 | Hayes | 395/75 |
| 5,179,634 | 1/1993 | Matsunaga | 395/75 |
| 5,329,612 | 7/1994 | Kakazu | 395/75 |
| 5,390,287 | 2/1995 | Obata | 395/67 |
| 5,400,246 | 3/1995 | Wilson | 364/146 |
| 5,459,816 | 10/1995 | Basehore | 395/3 |
| 5,485,550 | 1/1996 | Dalton | 395/51 |
| 5,510,975 | 4/1996 | Ziegler | 364/148 |
| 5,513,129 | 4/1996 | Bolas | 364/578 |
| 5,515,476 | 5/1996 | Nishidai | 395/3 |
| 5,517,613 | 5/1996 | Brant | 395/180 |
| 5,546,506 | 8/1996 | Araki | 395/51 |

OTHER PUBLICATIONS

Rodney A. Brooks, "A Robust Layered Control System For A Mobile Robot," IEEE Journal of Robotics and Automation, vol. RA-2, No. 1, Mar. 1986, pp. 14–23.

Muhammad Muazzam Ali, "Exploration-Based Design Synthesis of Behavior-Based Autonomous Robots,"Ph.D. dissertation, Colorado State University (Fort Collins), Summer, 1994, pp. 1-130.

*Primary Examiner*—Robert W. Downs
*Assistant Examiner*—Jeffrey S. Smith
*Attorney, Agent, or Firm*—Pennie & Edmonds LLP

[57] ABSTRACT

A behavioral based environment system and method for controlling an interactive playground. The system includes a system supervisor unit that utilizes a rule file, a scene file and a MIDI file in conjunction with a variety of sensor input to create an appropriate system response. Output control signals generated by the system supervisor unit are transmitted to other coupled computers to effectuate audio, visual and other effects in an interactive playground environment. The system supervisor has the desirable ability to load different scene, rule and MIDI files to create different system behavior in response to sensor stimuli, thereby creating a more adaptive behavioral based environment.

18 Claims, 4 Drawing Sheets

BEHAVIORAL BASED ENVIRONMENTAL SYSTEM AND METHOD FOR AN INTERACTIVE PLAYGROUND

FIELD OF THE INVENTION

The present invention generally relates to an apparatus and method for sensing physical and temporal changes in an environment and providing a response that varies with a plurality of those changes. More particularly, the present invention relates to a behavioral based environment system for controlling an interactive playground that changes the rules determining its output in response to multiple stimuli associated with the playground and people within it.

BACKGROUND OF THE INVENTION

Environments whose purpose is to entertain, educate or otherwise hold the attention of its participants risk becoming boring when each response is tied to a single input stimulus and the result is invariably the same. In such a system the amount of interaction is low and the result highly predictable. Presently, this is the condition of so-called interactive playgrounds. Present interactive playgrounds respond in the same way to a stimulus without significant variation over time. As these environments become predictable to the participants they correspondingly run the risk of becoming boring to those participants. Eventually, bored participants will choose to avoid such an environment. Thus, whether or not a particular environment becomes boring will often have economic and other consequences for the owners of such an environment. The degree of interaction and the predictability of the environment's response are two important factors in determining whether an environment becomes boring or not.

Presently, interactive playground environments utilize strict rule based systems to control their response. A strict rule based system always responds to stimuli according to one rule. The control is of a top-down type variety in the sense that there is a static set of rules that mediates the output response in a deterministic way.

FIG. 1 illustrates such a rule based system. In FIG. 1, outputs from sensors 10 are transmitted to a computer executing a set of rules 12. The set of rules 12 determine what response 14 is appropriate based on the sensor output 10. The set of rules 12 does not change.

In FIG. 2 the set of rules block 12 in FIG. 1 is expanded to show typical functional sub-systems within the rules block 12 to better illustrate the strict rule based system. The sequential nature of a strictly rule based system requires a perception unit 16 to process information from the sensors 10. The system 12 then updates its current information from the environment in the mapping unit 18. A planning unit 20 and an execution unit 22 then derive and transmit the response 14. These units individually do not have the ability to respond as a system, nor is every unit capable of creating any type of observable behavior in the output. Thus, the strictly rule based system takes an input and operates on that input to produce a result. For the same input, the same result is produced every time. This is often referred to in the art as "hit and run" animation. The designer of this type of system assumes a static problem domain, i.e. the response is static. Ultimately, participants in the strict rule based interactive playground discover the playground is too predictable, then those participants lose interest and avoid it.

In order to keep the participants' attention and reduce the risk of boredom, it would be desirable to have an interactive playground that is less predictable. Furthermore, it would be desirable for an interactive playground to promote higher levels of interaction with its participants.

SUMMARY OF THE INVENTION

The present invention improves an interactive playground by flexibly changing a set of rules that convert sensor output into system responses. Furthermore, the present invention is responsive to multiple input signals for each rule determination.

More specifically, the present invention provides a method and apparatus for responding to multiple input signals both to change playground response and to change the set of rules determining that response. The input signals include signals from different types of sensors, a time signal, a date signal and a gaming status signal which are indicative of the level of performance of participants in the interactive playground. The response can be displayed in output devices such as lights and speakers.

A preferred embodiment of present invention employs a system supervisor unit to effectuate a behavioral based environmental system for controlling an interactive playground. The system supervisor unit is a programmed computer that receives input signals from a variety of sensors coupled to it, as well as a time signal, a date signal and a gaming status signal. The system supervisor unit indirectly controls output devices such as lights and speakers by applying received input signals to a current set of rules in a rule file to determine which scenes in a scene file are to be performed. Selected scenes manifest themselves through control of the output devices. Furthermore, scenes can cause the system supervisor unit to replace the current rule file with another rule file stored in memory.

BRIEF DESCRIPTION OF THE DRAWINGS

Other aspects and advantages of the invention will become apparent upon reading the following detailed description and upon reference to the accompanying drawings, in which.

DETAILED DESCRIPTION OF THE PREFERRED EMBODIMENTS

Figure 1:
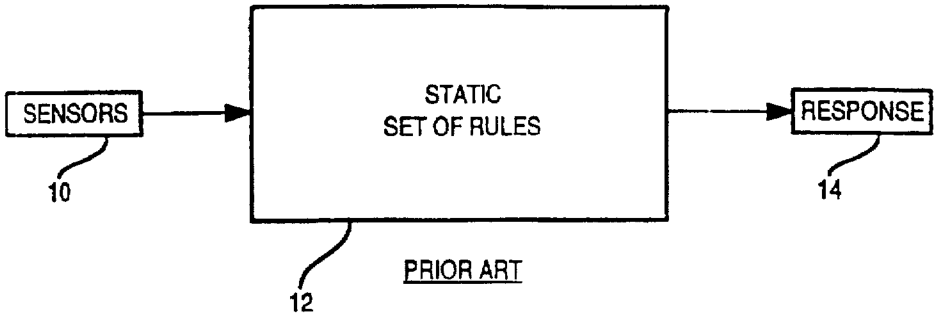
FIG. 1 is a flow chart of a prior art rule based system at a high level.
Figure 2:
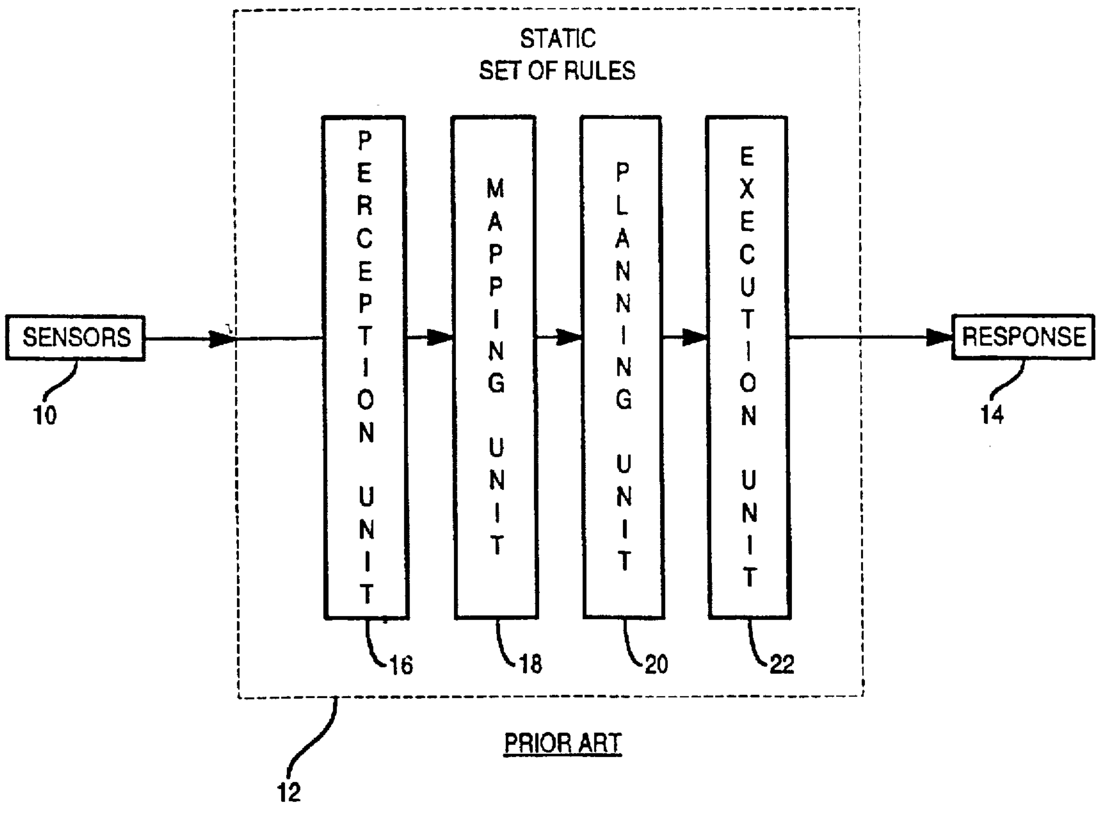
FIG. 2 is a flow chart of a prior art rule based system at a more detailed level than FIG. 1.

While the invention is susceptible to various modifications and alternative forms, a number of specific embodiments thereof have been shown by way of example in the drawings and will be described in detail herein. It should be understood, however, that this is not intended to limit the invention to the particular forms disclosed. On the contrary, the intention is to cover all modifications, equivalents and alternatives falling within the spirit and scope of the invention as defined by the appended claims.

The Behavioral Based Environment System (BBES) is an entertainment environment that provides a less predictable and more interactive solution to the field of "interactive entertainment", specifically, interactive playgrounds. The BBES provides a degree of surprise and uncertainty to the overall output of the system to make interaction with it more enjoyable. Participants interacting with the BBES influence and are influenced by the BBES to keep the participants' interest and encourage all participants to influence the response of the BBES. It should be noted that the BBES contains a current set of rules as part of its operation. However, unlike a strict rule based system, the BBES adapts itself to the changing environment by changing the rule file. The BBES changes the rule file based in part on what sensors indicate participants are doing and when. The ability to flexibly change the rule file in response to the environment is a desirable feature not found in other interactive playgrounds.

The BBES can be characterized as a decentralized method of control in which each set comprised of a scene file, rule file and musical instrument digital interface file is competent to perform a certain task. The combined efforts of each set of files serve to realize the desired response of the system. The BBES is therefore considered to be an incremental "bottom-up" approach to the building of automated systems. In comparison to a strictly rule based system, the BBES operates more independently and influences the nature of the system output. Stated another way, each set of files allows the system to provide a distinct and observable behavior to the system output. The BBES approach views the overall system response as a collection of behaviors exhibited by each set of scene, rule and Musical Instrument Digital Interface (MIDI) files. In contrast to enhancing a module in a strictly rule based system, BBES systems are improved by adding additional files that act as experts at particular tasks to improve overall system competency.

In accordance with the present invention, each set of scene, rule and Musical Instrument Digital Interface (MIDI) files is a separate complete entity that controls a system response in accordance with a participant's observable behavior or activity level in the environment. Depending on input from the environment, e.g. time of day, date, sensor output and gaming status, a system supervisor unit described fully below uses a current rule file to select one scene file and one MIDI file to control BBES response while other files are inhibited. When the environment changes, the current rule file may select a different scene file and MIDI file to be current, i.e. assume control. Furthermore, a current scene file can select a new rule file to become current. There is no "master" rule-base for this system. Each scene file, MIDI file and rule file are individually their "own" masters.

Figure 3:
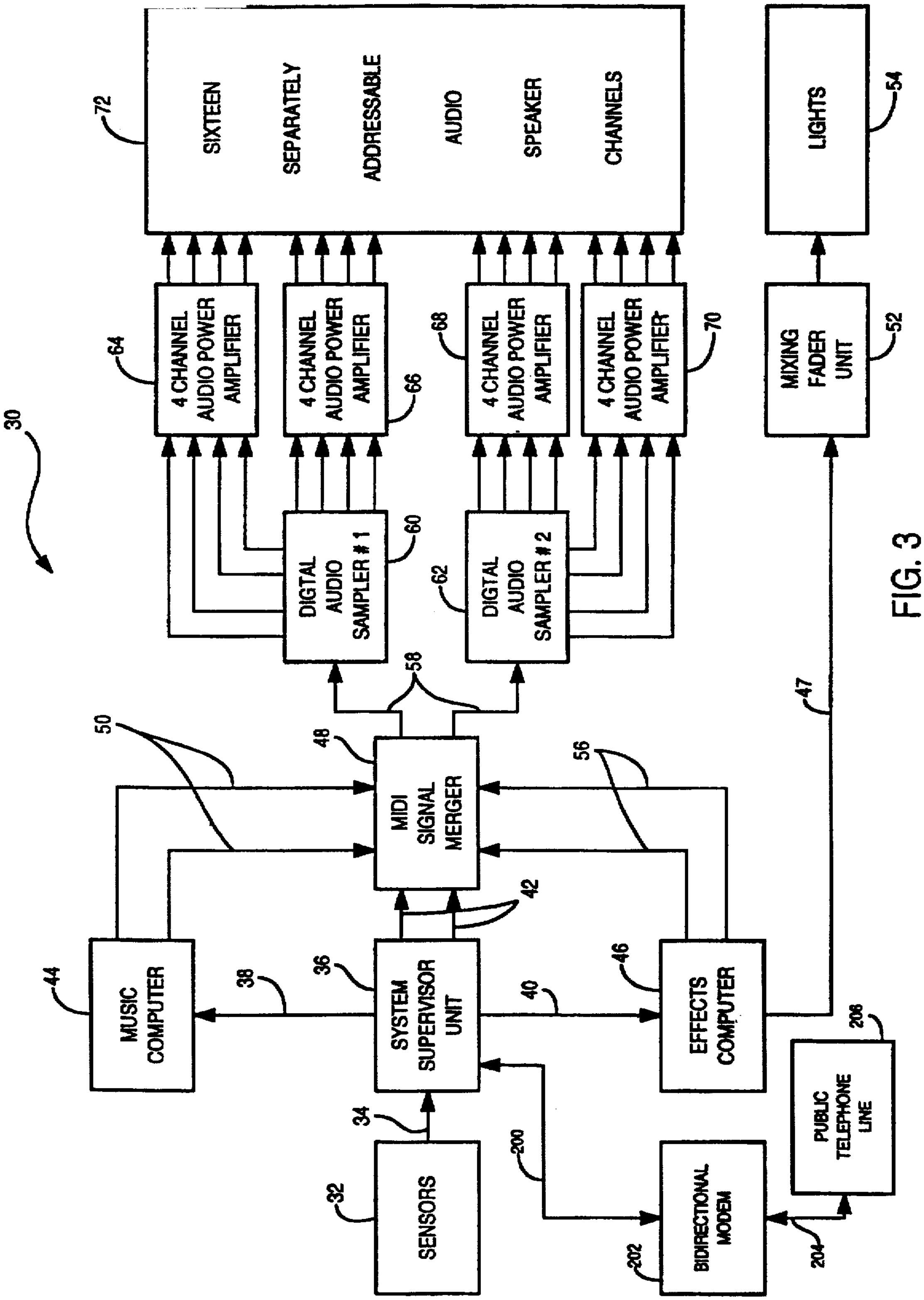
FIG. 3 is a block diagram overview of a hardware configuration of a behavioral based environmental system (BBES) according to one embodiment of the present invention.

A block diagram overview of the BBES hardware is illustrated in FIG. 3 with a full explanation on the detail provided below. FIG. 3 shows one embodiment of a behavioral based environment system 30 (BBES) according to the present invention. Sensors 32 are placed throughout an interactive playground (not shown) to monitor physical changes that occur such as the presence or absence of a child (not shown). Sensor output 34 typically from many sensors 32 is driven to a system supervisor unit 36, which is a key component of the BBES 30. The system supervisor unit 36 is a computer programmed with a software utility known as an ACME system supervisor utility (refer to FIG. 4). The system supervisor unit 36 is responsible for maintaining a rule file, a scene file and a musical instrument digital interface (MIDI) file. Only one rule file, scene file and MIDI file is active at any one time. Through application of these files the system supervisor unit 36 creates a music control signal 38, an effects control signal 40 and a pair of MIDI control signals 42 as prompted by the sensor output 34.

The sensors 32 include both passive and active devices. In one embodiment of the present invention, all sensors 32 that are active are powered by a 12 volt supply. All sensors 32 send "change of state" information to the system supervisor unit 36. For example, a ±5 volt pulse from each active sensor 32 will indicate to the system supervisor unit 36 that a sensor 32 was tripped. Zero volts from a sensor 32 indicates a non-tripped condition. In one embodiment four different kinds of sensors 32 are utilized.

A first kind of sensor 32 employed in one embodiment of the present invention is a microwave proximity sensor such as that manufactured by Micro Alarm Systems, Inc., 4809 East Firestone Blvd, Southgate, Calif. 90280. The microwave proximity sensor emits a ultra-high frequency radio signal that detects movement within an adjustable range of the sensor. The microwave proximity sensor is insensitive to wind or air movement, temperature, sunlight or noise. The radio signal can pass through plastic, glass, and upholstery materials and can be shielded somewhat with metallic materials. It is an active type sensor utilizing a 12 volt supply.

A second kind of sensor 32 employed in one embodiment of the present invention is a programmable optical sensor such as that manufactured by Pepperl+Fuchs, Inc., 1600 Enterprise Parkway, Twinsburg, Ohio 44087-2202. The optical sensor can be configured for sensing variable light/dark conditions. An adjustable timer allows the output pulse width to be modulated. The optical sensor can be used in conjunction with a polarized reflector to increase its sensing distance. The wavelength of the emitted light is in the visible or infrared range using an LED as the source. Sensors used with a reflector typically use light sources in the visible range and those without reflectors use an infrared source. The sensor is an active device requiring a 12 volt DC power supply.

A third kind of sensor 32 employed in one embodiment of the present invention is an impact sensor such as that manufactured by Select Controls Inc., 350 I Central Avenue, Bohemia, N.Y. 11716. This impact sensor is a passive devices requiring no power source. The device is essentially a switch in a normally open configuration. When an impact of 5 Gs or more are applied to the impact switch it forces electrical contact within the impact switch, thereby closing it. Since an impact is typically of short time duration, the amount of time the switch remains closed is not long enough for the system supervisor unit to be able to register the event. Signal conditioning is therefore required to lengthen the pulse generated by the impact switch to a value that the system supervisor unit can read.

A fourth kind of sensor 32 employed in one embodiment of the present invention is a pressure sensor such as that sold by Allied Electronics Inc., 7410 Pebble Drive, Fort Worth, Tex. 76118. Similar to the impact sensors, the pressure sensor is also a passive switch device in a normally open configuration. When pressure is applied to the device, electrical contact is made, thereby closing the switch. Eight ounces of "normal finger pressure" are required to close the switch contact.

The system supervisor unit 36 is a computer programmed with the software utility named the ACME system supervisor utility. The system supervisor unit 36 receives sensor output 34 from the sensors 32 described above. The ACME System Supervisor Utility is a software utility running in the system supervisor unit 36 computer that can send information to a music computer 44, an effects computer 46 and, via the pair of MIDI control signals 42, directly to a MIDI signal merger 48. Note that up to eight effects computers, eight music computers and eight MIDI lines can be accommodated in one embodiment of the present invention. The system supervisor unit 36 reads the scene file, rule file and, if directed to, the MIDI file to determine the appropriate output for the given state of the BBES. The system supervisor unit 36 can be configured via a scene and rule file to run games or other scenarios. While the system supervisor unit software is running, each frame (one frame equals 1/30th of a second), it does the following:

Read external events

Decrement timers

Read the keyboard, process an entry when ENTER is pressed

Test all rules in the rule file

Run any scenes that need to be run

Update the screen

The scene, rule, and MIDI files all work in conjunction with each other and are fully described below.

The scene file includes the following information:

Description: 1 to 30 character text description of the scene.

Priority: 1–100, 1 is lowest priority of a scene.

Duration: 0–1000000, length of a scene in frames (30 frames/sec).

Non-repeat: 0–1000000, number of frames a scene is prevented from repeating.

Spool: 0–1000000, number of frames a scene will spool is blocked by a priority.

Mix1–Mix8: 0–999, cue point for computer running the MIX program, 0 means do not cue. Each of the eight mix fields specifies a target device, while a number placed in that field selects a particular numbered effect to be run.

MIDI1-MIDI8: 0–999, number of MIDI command to send out serial port 1–8. MIDI commands are stored in the MIDI file. Each of the eight MIDI fields specifies a MIDI target device, while a number placed in that field selects a particular numbered effect to be run.

Each individual scene in the scene file contains information as to the nature of the system output. The output can be in the form of lighting, sound, or other special effects. The description is a text string that describes the form of the output. For example, a sound effect description might be entitled "Crowd_Cheer" to describe a crowd cheer type sound effect. "Flicker$_{13}$ Lights" might be the description of a lighting effect scene. Another important function of the description is to serve as a file name to load an entirely new scene, MIDI, and rule file. Each line of the scene file is assigned a priority that dictates the order in which all of the scenes will run. The scenes which have a higher priority will naturally run first and block all lower priority scenes from running. When a scene runs, a timer starts counting down from the number in the duration filed to zero. (Refer to illustrative example below.) While duration is non-zero, priority for that scene is assigned to all machines that have a non-zero value in the mix field. While the duration is non-zero, no other lower priority scenes may run. When the duration becomes zero, the next highest priority scene commences to run. If a scene attempts to run and is blocked by a higher priority scene, the system supervisor unit 36 will continue to attempt to run the lower priority until the spool field counts down from the value stored there to zero. If the spool time expires before the higher priority scenes have finished running, the lower priority scene will never run until it is called again by the rule file. The non-repeat field is the amount of time in frames that a scene is prevented from running after it is run the first time. The mix1–mix8 and MIDI1–MIDI8 fields specify the devices that the system supervisor unit will send output. Mix1–mix8 refers to the computers that control certain effects, as described fully below. The effects computer 46 is an example of a device that can accept this type of information. MIDI1–MIDI8 refers to computers or other devices that are capable of receiving information in the MIDI format, as described fully below.

The MIDI file is a file referenced by the scene file in the MIDI1–MIDI8 fields. This file sends information to MIDI devices only, e.g. the music computer 44, the effects computer 46, and the MIDI signal merger 48. MIDI protocol requires a certain information format that this MIDI file provides. Specifically, the MIDI file includes the following information:

Number.: 1–100, reference number of the MIDI command

Type: ON (note on), OFF (note off), PC (program change)

Channel: 1–16, MIDI channel number

Value: Note number of program change number, 0–127

Velocity: 0–127, Influences the sound quality

The rule file provides the control logic for a given scene file and MIDI file. It is a series of conditional statements that resembles that of traditional programming languages. The rule file consists of variables, timers, and logical operators. Dependent on the logic of a given rule file, two courses of action can occur: (1) individual scenes within a scene file are run to create a response observable by participants in the interactive playground or (2) a completely new scene, rule, and MIDI file are loaded to compensate for a change in the interactive playground.

The following lines give an example of some of the typical rules used in a rule file:

V1+1E3^1 ;increment V1 When sensor E3 is pressed (changes from 0 to 1)

V1–1E6^1 ;decrement V1 when sensor E6 is pressed

V1*0E7^1 ;set variable V1 to 0 when E7 is pressed

V0*V3E4^1 ;set VO to value of V3 when E4 is pressed

V2*1V4&V5 ;set V2 to 1 if both V4 and V5 are non zero

T1*90E5^1 ;set time T1 to 90 frames when E5 is pressed

S3*1E3^1 ;run scene S3 when switch E3 is pressed

S4*1V1=6 ;run scene S4 when V1==6

Through application of the rule, scene and MIDI files, the sensor output 34 prompts the system supervisor unit 36 to determine an appropriate system response. One such response begins in the form of the music control signal 38. The music control signal 38 is transmitted from the system supervisor unit 36 to the music computer 44.

The music computer 44 receives the music control signal 38 which directs the music computer 44 to play a pre-sequenced "song" that has been recorded using sequencing software. The music computer 44 is responsible for providing and controlling the playing musical sequences longer than a few seconds. In one embodiment the sequencing software is Cakewalk Professional 3.0 from Twelve Tone Systems, Inc., P.O. Box 760, Watertown, Mass. 02272–0760. There is a general difference in length between a "song" and a "sample". A "song" is a musical piece that can last between about 30 seconds and ten minutes in length. A "sample" is usually a quick audio response of not more than a thirty seconds.

Providing a cue to MIDI devices are the MIDI1–MIDI8 fields located in the scene file of the system supervisor unit.

as described above. The cue specifies a device and song that device should play. Once the music computer 44 has received the cue from the system supervisor unit 36, and no other machines with a higher priority are blocking it, the music computer 44 transmits MIDI information such as Program change, Note On/Off, Note Number, Velocity, etc. The MIDI information is transmitted over at least one line of a pair of MIDI lines 50, both of which are received by the MIDI signal merger 48. The song that is played depends on what program change number is used within the MIDI file of the system supervisor unit 36.

The music computer 44 is generally responsible for storage and retrieval of longer duration songs, while the system supervisor unit 36 is generally responsible for short duration musical samples. This dichotomy solves the problem of managing the large amounts of memory it takes to store songs. Note that a sample of only a few seconds can take up nearly one megabyte of space. Thus, songs take up even more significant amounts of memory because of their greater duration. Sequencing software is used in the music computer 44 to store the songs information. After the song information is retrieved from the music computer 44, it is transmitted over one line of the pair of MIDI lines 50 to the MIDI signal merger 48.

Like the music computer 44, the effects computer 46 receives its instructions from the system supervisor unit 36. The system supervisor unit 36 drives the effects control signal 40 to the effects computer 46, for example, to prompt lighting effects. Other effects controlled by the effects computer such as those produced by fog, smoke and wind machines are envisioned as well. The effects control signal 40 includes cues in the MIDI1–MIDI8 fields and the mix1–mix8 fields of the scene file in the system supervisor unit 36 directing a particular effects computer 46 to respond with a particular effects sequence. Note that up to eight effects computers 46 can be attached to the system supervisor unit 36 in one embodiment of the present invention. But like the music computer 44, the effects computer 46 can only send output if there are no other higher priority machines blocking it from running. One difference between the effects computer 46 and the music computer 44 is that the music computer 44 is considered a MIDI device, while the effects computer 46 is considered a Mix device. A Mix device is accessed by the appropriate mix1–mix8 field in the scene file. A MIDI device is controlled by the appropriate MIDI1–MIDI8 field in the scene file. The information in the mix1–mix8 fields of the scene file tells the effects computer 46 to play a pre-programmed lighting sequence. The information in the MIDI1–MIDI8 fields allows the effects computer 46 to synchronize its lighting effects to an audio response generated by the music computer 44 or the system supervisor unit 36. Note that in one embodiment the effects computer 46 drives a fader control line 47 to a mixing fader unit 52 which in turn controls lights 54. The fader control line 47 carries the control signals instructing the mixing fader unit 52. The mixing fader unit 52 is adapted to control the voltages required by the lights 54. The effects computer 46 also drives a pair of MIDI lines 56, both of which are received by the MIDI signal merger 48.

MIDI (Musical Instrument Digital Interface) is an information protocol that is commonly used by electronic instrument manufacturers to communicate information between musical devices. Computers "speak" MIDI to the various MIDI devices used in the system through the use of expansion boards. The MIDI signal includes a Note On/Note Off, Program Change, Velocity, MIDI Channel, and Note Number. Note On/Note Off merely means to play or stop playing a given musical note specified on the Note Number. The Note Number is a number that refers to the notes as seen on a typical piano keyboard. Each MIDI program can contain a set of notes (1–127). When a Program Change is specified via MIDI a new set of notes with different sounds can be accessed. From the musicians perspective, this allows many different instruments to be played on the same physical instrument. When using multiple MIDI devices, it is possible to select a single MIDI device by assigning it a MIDI Channel. In this way only that particular device will receive the information if the other devices are operating on different channels. Finally, the Velocity of a note refers to the speed at which a key is pressed on a typical piano keyboard. Different velocities correspond to different sounds on the keyboard.

In one embodiment of the present invention, the MIDI signal merger 48 is implemented in a MIDI Time Piece II by Mark of the Unicorn, Inc., 1280 Massachusetts Ave., Cambridge, Mass. 02138. The MIDI Time Piece II is a MIDI signal multiplexing device that allows up to 8 input devices to be assigned in any combination to up to 8 output devices. For the BBES 30, the MIDI signal merger 48 is configured to merge the two MIDI signals from the system supervisor unit 36, the two MIDI signals from the music computer 44, and the two MIDI signals from the effects computer 46 (total of 6 MIDI lines) into two MIDI Lines (refer to FIG. 3). The MIDI signal merger 48 makes sure that the proper information is routed to the appropriate MIDI output device. In this case the output devices are a digital audio sampler #1 60 and a digital audio sampler #2 62. The MIDI signal merger 48 is desirable because each of the digital audio samplers 60, 62 have only one MIDI line input and there are three MIDI lines that need to be routed to each digital audio sampler.

In one embodiment of the preferred invention, digital audio sampler #1 60 and digital audio sampler #2 62 are implemented in a CD3000 Akai Digital Audio Sampler by Akai Electric Co. Ltd. of Tokyo Japan. The Akai digital audio sampler allows the playback of a pre-recorded audio sample on up to eight user specifiable outputs. The Akai unit can store up to 32 megabytes of digitally recorded sounds. These sounds can be edited within the digital audio sampler to the desired length, pitch, and volume, etc. Once the sample has been edited it is placed in a program for playback. In the BBES 30 each sample is assigned to a keygroup. A keygroup may consist of one keygroup for the entire keyboard or one keygroup for each note on the keyboard. Within the Akai sampler, this keygroup can be represented as an actual musical note (like C# or F) or as a number (1–127). The following figure depicts how the Akai sampler receives information and sends output. The digital audio samplers use memory to store the individual instrument's sound. These sounds are only a few seconds at most in length and can be used for more than one song.

As illustrated in FIG. 3, both digital audio samplers 60, 62 transmit eight signals. The eight samples are organized into two groups of four signals. Because two digital audio samplers 60, 62 are used, four groups of four signals each are received by four four-channel audio power amplifiers 64, 66, 68, and 70. Thus, in one embodiment of the present invention there are four amplifiers 64, 66, 68, and 70 driving sixteen separately addressable audio speaker channels 72. Each audio channel can drive at least one speaker associated with it to produce an audio output.

The output transmitted by the system supervisor unit 36 can take on a variety of forms. Audio responses can be provided in the form of short sound bites or longer songs. The system supervisor unit 36 and the music computer 44 are responsible for the sound bytes and songs respectively. Lighting and other special effects such as fog, smoke and wind, as well as some sound effects are mediated by the effects computer 46. All audio information sent from the system supervisor unit 36, music computer 44, or effects computer 46 is merged into two signals by the MIDI signal merger 48. Of the two resulting signals, one is sent to Digital Audio Sampler #1 60 and the other is sent to Digital Audio Sampler #2 62. The digital audio samplers 60, 62 contain the basic sounds that are referenced by the three computers. Depending on the MIDI signals received by the digital audio samplers 60, 62, each of the digital audio samplers can send the audio response to any of eight separately addressable speaker channels. Thus for two digital audio samplers, up to sixteen separately addressable speaker channels 72 are available. The audio is then amplified to a suitable volume level and played out the appropriate speaker.

Figure 4:
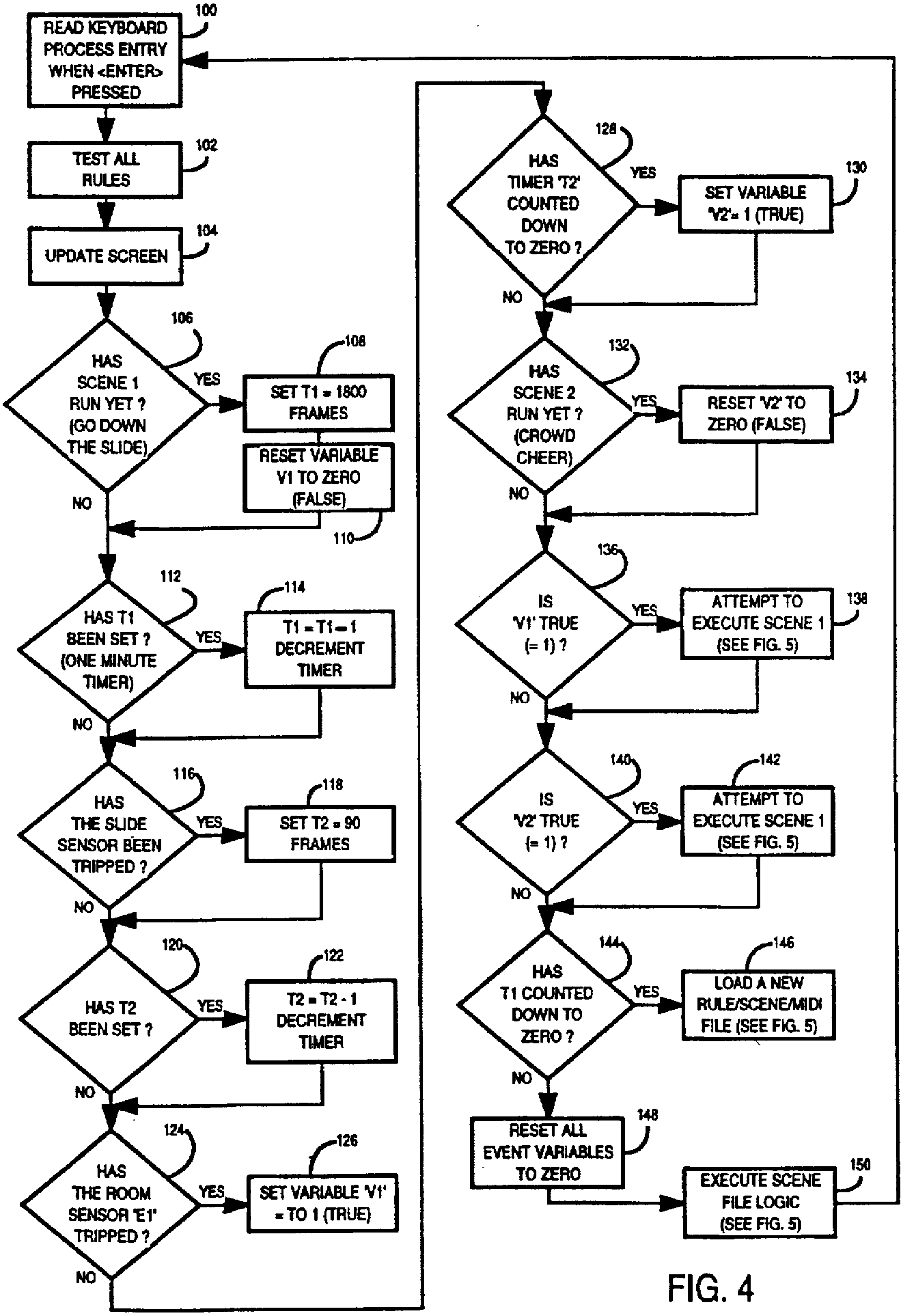
FIG. 4 is a flow chart of an illustrative example of a behavioral based environmental system (BBES) according to one embodiment of the present invention.

FIG. 4 shows an illustrative example of how the system supervisor unit utilizes the scene, rule and MIDI files to achieve a response for the BBES in an interactive environment. The interactive environment includes a small room situated at the top of a slide. There is a proximity sensor in the small room to detect the presence of a child. There is also a proximity sensor located midway down the slide. If a child enters the small room, he or she is prompted to "Go down the slide." Once down the slide, a "crowd cheer" sample will sound as an audio reward for going down the slide. If no child enters the small room for 1 minute, the system supervisor unit will read a scene within the scene file telling it to load a new rule, scene and MIDI files. The "Go down the slide" response has a higher priority (100) in the scene file than the "Crowd cheer" response priority (99). This means that if both sensors trigger simultaneously, the "Go down the slide" response will have senior priority and will run first. In the code, E1 refers to the small room sensor, E2 is the slide sensor. "Go down the slide" is S1 and "Crowd cheer" is S2. S3 will load a new set of games by loading a new scene, rule and MIDI file for the small room and slide.

```
T1*1800SÎ 0          ;start a one minute timer after the scene
1 runs
T2*90E2̂ 1            ;start a 3 second timer after the slide sensor
trips
V1*1EÎ 1             ;child in the small room sets V1 to one
V2*1T2̂ 0             ;V2 is set when T2 counts to zero (child at
bottom of slide)
V1*OSÎ 1             ;reset variable V1 after "Go down the slide"
runs
V2:OS2̂ 0             ;reset variable V2 after "Crowd cheer" runs
S1*1V1=1             ;run scene 1 then V1 = 1
S2*1V2=1             ;run scene 2 when V2 = 1
S3*1TÎ               ;load new rule and scene file if 1 minute is up
```

The above rule file executes similar to that of an infinite "While Loop" once each frame. The following scene file then provides an output response:

| Scene | Description | Priority | Duration | Non-Repeat | Spool | Mix1–Mix8 | MIDI1–MIDI8 |
|---|---|---|---|---|---|---|---|
| S1 | Go down the slide | 100 | 200 | 300 | 0 | 0,0,0,0,0,0,0,0 | 1,0,0,0,0,0,0,0 |
| S2 | Crowd cheer | 99 | 800 | 1000 | 300 | 0,0,0,0,0,0,0,0 | 0,2,0,0,0,0,0,0 |
| S3 | Game #2 | 999 | 999 | 999 | 999 | | |

The above scene file will obtain information from the MIDI file as to which audio sample will be played. In the scene file, the MIDI1–MIDI8 fields refer to an individual MIDI compatible device. The number in a particular MIDI1–MIDI8 field position is a line number reference to the MIDI file. The MIDI file is the one associated with the scene file and both are retrieved together. For example, in the first line of the scene file the "1" in the first field of the MIDI1–MIDI8 fields is referring to line #1 of the MIDI file. In this example, we are assuming that there are two MIDI devices: Digital audio sampler #1 and Digital audio sampler #2 . Sampler #1 is the first MIDI device as indicated by the MIDI1 field. Sampler #2 is the second MIDI device as indicated by the MIDI2 field. Sampler #1 will operate on MIDI channel #8 and Sampler #2 will operate on the MIDI channel #9 in this example. The resulting MIDI file is as follows:

| Line # | Type | Channel | Note | Velocity |
|---|---|---|---|---|
| 1 | ON | 8 | 24 | 64 |
| 2 | ON | 9 | 35 | 64 |

The "Go down the slide" audio response is digitally stored in Sampler #1. Within Sampler #1, this sample is referenced by the "note" 24. The "Crowd cheer" response is digitally stored in Sampler #2. Within Sampler #2, the crowd cheer sample is referenced by the "note" 35. No reference is needed for scene 3, as a completely new rule, scene, and MIDI file will be loaded.

Figure 5:
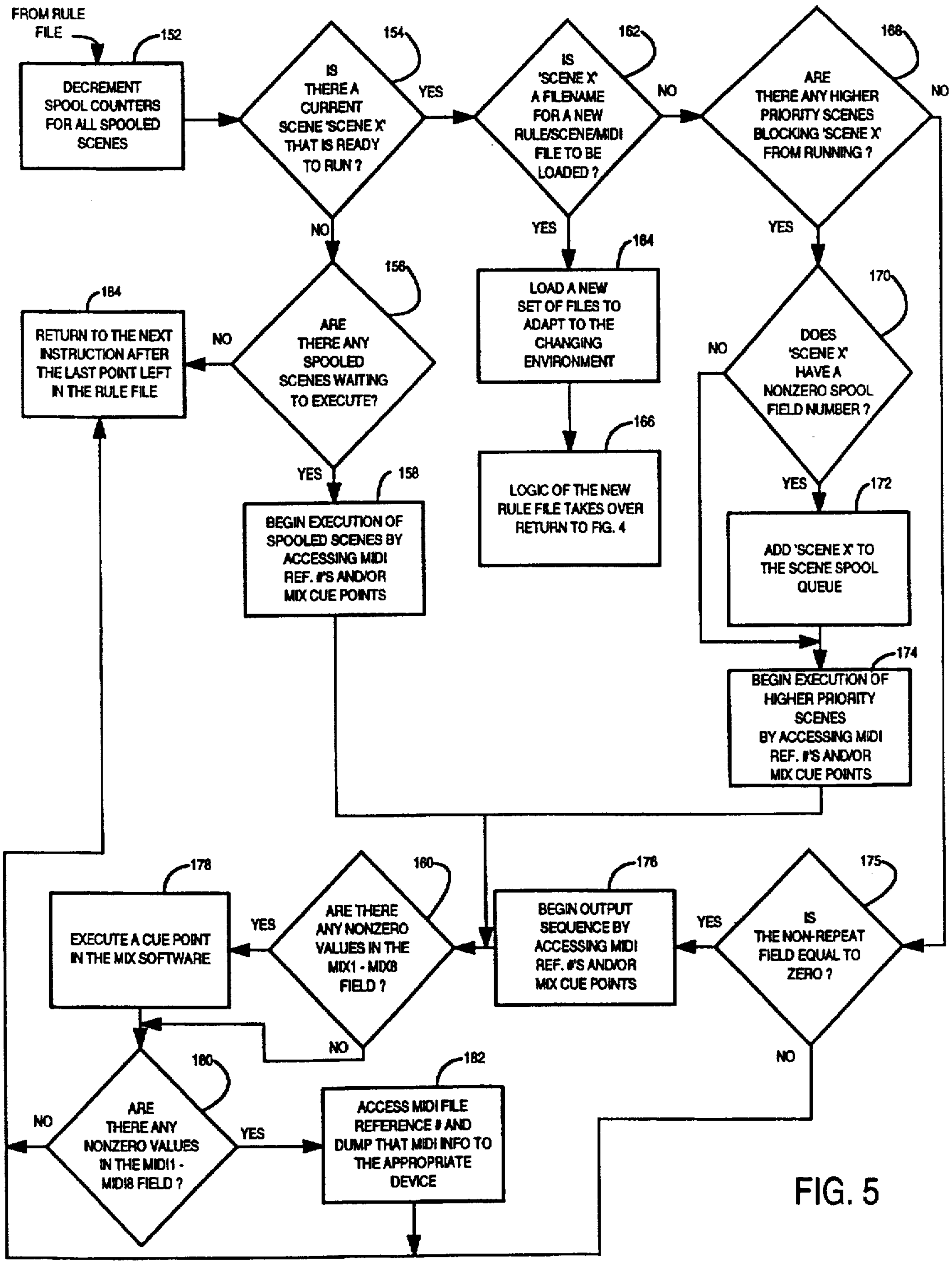
FIG. 5 is a flow chart of an illustrative example of a behavioral based environmental system (BBES) according to one embodiment of the present invention.

The previous illustrative example is shown in FIGS. 4 and 5. FIGS. 4 and 5 are flowcharts illustrating a one embodiment of the present invention in flowchart form. A command is entered at a system keyboard coupled to the system supervisor unit 36. The command is processed by the system supervisor unit 36 after the "enter" key is depressed in step 100. This causes the system supervisor unit 36 to load initial scene, rule and MIDI files in order to begin processing. In this example, the files from the illustrative example described above are loaded. When step 100 is encountered again the system supervisor unit 36 will determine if a new command has been issued based on activation of the "enter" key, otherwise the system supervisor unit 36 will go on to step 102 to test all rules in the rule file that is current. The screen is then updated in step 104. Steps 100, 102 and 104 occur regardless of the contents of the scene file. Next, in step 106 the system supervisor unit 36 looks at the S1 variable to determine if scene 1 has run and been completed. If scene 1 ran the system supervisor unit 36 sets T1 to 1800 frames, or one-minute worth of time at 1/30 of a second per frame, in step 108. The system supervisor unit 36 will also reset variable V1 to zero, indicating a false condition, in step 110. After either step 106 or step 110 is completed, the system supervisor unit 36 tests whether T1 had been set, more specifically, whether T1 is not equal to zero in step 112. If T1 was set then it is decremented in step 114. After either step 112 or step 114 is completed, the system supervisor unit 36 examines slide sensor E2 to determine whether it was tripped in step 116. If E2 made a logical zero to one transition the system supervisor unit 36 will interpret this as caused by the presence of a child in step 116. If the sensor was tripped, T2 is set to 90 in step 118. After either step 116 or step 118 is completed, the system supervisor unit 36 examines T2 in step 120 to determine if it was set. If T2 is not equal to zero, it is decremented in step 122.

After either step 120 or step 122 is completed, the system supervisor unit 36 examines small room sensor E1 in step 124 to determine if it was tripped. If E1 made a logical zero to one transition the system supervisor unit 36 will interpret this as caused by the presence of a child in step 124 and set variable V1 to one in step 126. After either step 124 or step 126 is completed, the system supervisor unit 36 examines whether T2 has counted down to zero in step 128. If T2 is equal to zero then variable V2 is set to one, a true state, in step 130. After either step 128 or step 130 is completed, S2 is examined to determine if scene two has completed in step 132. If scene two had been completed, then variable V2 is reset to zero, a false condition, in step 134. After either step 132 or step 134 is completed, variable V1 is tested to determine if it is true, in step 136. If V1 is true, i.e. set to logical one, then the system supervisor unit 36 will attempt to execute scene one in step 138. Step 138 leads to further steps illustrated in FIG. 5, specifically step 152. After either step 136 or the steps of FIG. 5 are executed as indicated in step 138, the system 30 examines variable V2 to determine if it is set to a true value, in step 140. If V2 is true, as represented by a logical one, then the system 30 will attempt to execute scene 1 in step 142. As in step 138, step 140 refers to the steps of FIG. 5, beginning with step 152, described below. After either step 140 or the steps of FIG. 5 are executed as indicated in step 142, the system 30 examines T1 to determine if it has counted down to zero in step 144. If T1 is equal to zero then the system 30 will go to step 152 of FIG. 5 and after following the appropriate steps, load new files as indicated in step 146. If T1 is not equal to zero then the system 30 will reset all event variables to zero in step 148, and execute the scene file logic in step 150 as further described in FIG. 5. After step 150 is completed, the system 30 returns to step 100 and the process begins again.

FIG. 5 illustrates in a flow chart diagram the steps performed by the system supervisor unit 36 after the steps of FIG. 4. For example, after steps 138, 142, 146, or 150 of FIG. 4, the system supervisor unit 30 will decrement spool fields, which act as counters, for all spooled scenes, in step 152. Next, the system 30 will determine if there is a current scene to be run in step 154, as indicated by the rule file. If there are no scenes ready to run then the system 30 determines if there are any spooled scenes waiting to run in step 156. If there are no spooled scenes waiting to execute then the system 30 returns to the next instruction after the last point left in the rule file in step 184. However, if there are spooled screens waiting to execute then the system 30 will begin execution of spooled scenes by accessing the appropriate Mix or MIDI devices in step 158. After step 158 is completed the system will continue with step 160 as further described below. Returning to step 154, if there is a current scene that is ready to run then the system 30 determines whether that scene has a filename in the description field of the scene file that indicates new files are to be loaded in step 162. If new files are to be loaded, this occurs in step 164 and the system 30 returns to the steps in FIG. 4 with the logic of the new rule file controlling system 30 operation.

However, if in step 162 new files are not to be loaded then the system 30 tests whether there are any higher priority scenes blocking the current scene "scene x" from running in step 168. If there are, the system 30 further tests in step 170 whether "scene x" has a nonzero spool field number. If the spool field number is nonzero, then "scene x" is added to the scene spool queue in step 172. However, if the spool field number is zero, then the system 30 will begin execution of the highest priority scene by accessing the appropriate Mix and MIDI devices in step 174, then continuing to step 160 as described below. Step 174 is also executed after step 172 is completed as well.

If at step 168 there were no higher priority scenes blocking "scene x" (the current scene) then the system 30 will determine if the value of the non-repeat field is equal to zero in step 175. If the non-repeat field is not equal to zero then the system jumps to step 184 and returns to the next instruction after the last point left in the rule file, as depicted in FIG. 4. However, if the non-repeat field is equal to zero, the system 30 will begin execution of the current scene by accessing the appropriate Mix and MIDI devices in step 176, as described below.

After steps 158, 174 and 176 are completed, the system 30 determines whether there are any nonzero values in the Mix1–Mix8 fields in step 160. If there are nonzero values then a cue point instruction is sent to the appropriate mix device so that the associated effect can be initiated in step 178.

After either step 160 or step 178 is completed, the system 30 determines whether there are any nonzero values in the MIDI1–MIDI8 fields, in step 180. If there are nonzero values in the MIDI fields then the appropriate MIDI device is referenced by the number in the corresponding MIDI field in step 182. After either step 180 or step 182 has completed, the system executes step 184 to return to the next instruction after the last point left in the rule file in FIG. 4.

Returning to FIG. 3, in an alternative embodiment of the present invention the system supervisor unit 36 is connected through a bidirectional line 200 to a bidirectional modem 202. The bidirectional modem 202 is further connected through another bidirectional line 204 to a public telephone line 206. The bidirectional modem 202 is adapted to transmitting information between the system supervisor unit 36 and the public telephone line 206. Transmitting information between the system supervisor unit 36 and the public telephone line 206 enables useful interaction with a remote system (not shown). The remote system can be any type of system capable of telephone communication including a remote computer terminal or another interactive playground. Via the telephone connection described, scene, rule and MIDI files, as well as variables, are transferred back and forth between the system supervisor unit 36 and the remote system. Diagnostic routines are also downloaded from, and initiated by, the remote system. Results from the diagnostic routine are read by the remote system over the public telephone line 206 after completion of the diagnostic routine. Diagnostic routine results can tell a person utilizing the remote system of problems with the interactive playground. Diagnostics also indicate the number of sensor trips (sensor triggerings) during a particular period of time, thus indicating playground usage. Note that other telephone lines, such as dedicated private telephone lines, can be substituted for the public telephone line 206 employed here. As mentioned above, the remote system can take the form of another interactive playground. The other interactive playground will share some rule, scene and MIDI files with the system supervisor unit 36. Therefore, network gaming, i.e. generally the sharing of files between different systems to control interactive environments, is enabled through the above described connections over the public telephone line 206.

Thus, there has been described herein a behavioral based environmental system and method for implementing an interactive playground.

The following program listing is a present preferred listing for the behavioral based environmental system and method for an interactive playground described above:

ACME_VER.H

```
#define SSU_VER         "1.34"   /* version of SSU.EXE */
#define OMEGA_VER       "1.1"   /* version of OMEGA.EXE */
#define QUATEST_VER "1.0"       /* version of QUATEST.EXE */
```

COMMLIB.H

```
#ifndef COMMLIB_DOT_H
#define COMMLIB_DOT_H

/*
 * COMMLIB.H       4.00A  December 12, 1992
 *
 * The Greenleaf Comm Library
 *
 * Copyright (C) 1985-1992 Greenleaf Software Inc.  All Rights Res
erved.
 *
 * NOTES
 *
 *  This is the master include file for CommLib Level 2 functions.
  You
 *  pretty much have to include this file.  It has all the prototy
pes,
 *  macros, and structures needed to use CommLib Level 2.
 *
 * MODIFICATIONS
 *
 * December 12, 1992  4.00A : Initial release
 *
 */

#include "compiler.h"
#ifdef GF_WINDOWS
#include <windows.h>
#endif

#define COMLIBVERSION   0x400          /* Comm library Version  *
/

/*
 * 16550 trigger definitions are used across more than one driver.
 */
typedef enum trigger_level{
    TRIGGER_DISABLE    = 0x00,
    TRIGGER_01         = 0x01,
    TRIGGER_04         = 0x41,
    TRIGGER_08         = 0x81,
    TRIGGER_14         = 0xc1
} TRIGGER_LEVEL;

/*
 * People wonder why COM1 is an int instead of a macro.  The reaso
n goes back
 * to the cutover to Commlib 3.2.  Lots of functions that used to
take an
 * int port number in 3.1 changed to taking a PORT structure point
er in
```

COMMLIB.H

```
 * 3.2.  Normally, if you try to pass an int as a pointer you will
 get an
 * error, so users that didn't update their code properly could co
unt on
 * getting an error from the compiler.  however, COM1 is defined a
s 0, and
 * 0 is a special value that can be passed as a pointer.  So defin
ing it
 * as an extern int avoids that particular problem, and will cause
 an
 * error if somebody tries to pass COM1 as an argument to ZmodemSe
nd().
 */
#ifdef __cplusplus
extern "C" {
#endif
extern int COM1;
#ifdef __cplusplus
}
#endif

#define COM2            1
#define COM3            2
#define COM4            3
#define COM5            4
#define COM6            5
#define COM7            6
#define COM8            7
#define COM9            8
#define COM10           9
#define COM11           10
#define COM12           11
#define COM13           12
#define COM14           13
#define COM15           14
#define COM16           15
#define COM17           16
#define COM18           17
#define COM19           18
#define COM20           19
#define COM21           20
#define COM22           21
#define COM23           22
#define COM24           23
#define COM25           24
#define COM26           25
#define COM27           26
#define COM28           27
#define COM29           28
#define COM30           29
#define COM31           30
```

COMMLIB.H

```
#define COM32            31
#define COM33            32
#define COM34            33
#define COM35            34

/*
 * Macro's and constants to ease the reading of Micro Channel POS
 * registers.
 */
#define POSCHNLSELECT               0x96        /* POS Channel Selec
t */
#define POSLOWIDPORT                0x100       /* POS I.D. Low byte
 */
#define POSHIGHIDPORT               0x101       /* POS I.D. High byt
e */
#define POS2PORT                    0x102       /* POS Adapter info
ports 2-5*/
#define POS3PORT                    0x103
#define POS4PORT                    0x104
#define POS5PORT                    0x105
#define POSCHMIN                    0x08        /* Minimum channel *
/
#define POSCHMAX                    0x0f        /* Maximum channel *
/
#define POSCHNLDISABLE              0x00        /* Disable channel a
ccess */

#define POSSELECTCHANNEL( p )      _asoutb( POSCHNLSELECT, p )
#define POSDESELECTCHANNEL( p )    _asoutb( POSCHNLSELECT, POSCHNLDI
SABLE )
#define POSID()                    ( ( _asinb( POSHIGHIDPORT ) << 8
) + \
                                   _asinb( POSLOWIDPORT ) )
#define POS2INFO()                 _asinb(POS2PORT)
#define POS3INFO()                 _asinb(POS3PORT)
#define POS4INFO()                 _asinb(POS4PORT)
#define POS5INFO()                 _asinb(POS5PORT)

#define TICKS_PER_SECOND              18
#define MILLISECONDS_PER_TICK         55

#ifndef TRUE
#define TRUE            1
#endif

#ifndef FALSE
#define FALSE           0
#endif

#define GF_MKFP( seg, offset ) ( void far *) ( ( (unsigned long) \
                    ( seg ) << 16 ) + ( offset ) )
```

COMMLIB.H

```
#define GF_MKFFP( seg, offset ) (void (far * )()) ( ( (unsigned lo
ng) \
                                      ( seg ) << 16 ) + ( offset ) )

#define IRQ0    0
#define IRQ1    1
#define IRQ2    2
#define IRQ3    3
#define IRQ4    4
#define IRQ5    5
#define IRQ6    6
#define IRQ7    7
#define IRQ8    8
#define IRQ9    9
#define IRQ10  10
#define IRQ11  11
#define IRQ12  12
#define IRQ13  13
#define IRQ14  14
#define IRQ15  15

/*
 * Line Status
 */
#define OVERRUN 2
#define PARERR  4
#define FRAMERR 8
#define BREAKDET 16
#define THRE 32
#define TEMT 64

/*
 * Modem Status
 */
#define CTSCHG  1
#define DSRCHG  2
#define RITRAIL 4
#define CDCHG   8
#define CTS     16
#define DSR     32
#define RI      64
#define CD      128

/*
 * Error codes returned by all functions OR in _aserror.
 */
#define ASSUCCESS                   0
#define ASGENERALERROR             -1
#define ASINVPORT                  -2
#define ASINUSE                    -3
#define ASINVBUFSIZE               -4
```

COMMLIB.H

```
#define ASNOMEMORY              -5
#define ASNOTSETUP              -6
#define ASINVPAR                -7
#define ASBUFREMPTY             -8
#define ASBUFRFULL              -9
#define ASTIMEOUT               -10
#define ASNOCTS                 -11
#define ASNOCD                  -12
#define ASNODSR                 -13
#define ASNO8250                -14
#define ASXMSTATUS              -15
#define ASUSERABORT             -16
#define ASFILERR                -17
#define ASXMERROR               -18
#define ASNOWIDERX              -19
#define ASCONFLICT              -20
#define ASCRCMODE               -21
#define ASNOHAYESOK             -22
#define ASNOHAYESRESPONSE       -23
#define ASNOTSUPPORTED          -24
#define ASILLEGALBAUDRATE       -25
#define ASILLEGALPARITY         -26
#define ASILLEGALWORDLENGTH     -27
#define ASILLEGALSTOPBITS       -28
#define ASNOCOPYRIGHTNOTICE     -29
#define ASDRIVERNOTINSTALLED    -30
#define ASOVERFLOW              -31
#define ASCONNECTFAILURE        -32
#define ASDOSEXTENDERERROR      -33
#define ASILLEGALBOARDNUMBER    -34
#define ASBOARDINUSE            -35
#define ASHANDSHAKEBLOCK        -36
#define ASMAXPORTSEXCEEDED      -37
#define ASILLEGALIRQ            -38
#define ASIRQINUSE              -39
#define ASUSERDEFINEDERROR      -75
/*
 *Parity types
 */
#define P_NONE          0
#define P_ODD           1
#define P_EVEN          2
#define P_S_STICK       3
#define P_M_STICK       4

#ifdef __cplusplus
extern "C" {
#endif
extern char ParityLetter[];
#ifdef __cplusplus
}
```

COMMLIB.H

```
#endif

typedef enum { OUT_OF_MEMORY = -1,
               GREENLEAF,
               BIOS,
               EXTENDED_BIOS,
               FOSSIL,
               DIGIBOARD_COMXI,
               DIGIBOARD_PCXE,
               DIGIBOARD_UNIVERSAL,
               GREENLEAF_FAST,
               MODEM_ASSIST,
               PHAR_LAP_286,
               RATIONAL_SYSTEMS_DOS_16M,
               SPARKLE,
               ARNET,
               STARGATE,
               MICROSOFT_WINDOWS,
               OTHER
             } DRIVER_TYPE;

typedef enum { OVERRUN_ERROR  = 2,
               PARITY_ERROR   = 4,
               FRAMING_ERROR  = 8,
               BREAK_DETECTED = 16
             } LINE_STATUS_CODES;

typedef enum { CTS_SET   = 0x10,
               DSR_SET   = 0x20,
               RI_SET    = 0x40,
               CD_SET    = 0x80
             } MODEM_STATUS_CODES;


typedef  void ( GF_CONV *PORT_DUMPER )( char *data );

/*
 * This is the PORT structure that everything else in Level 2 revo
lves
 * around.  All driver routines operate on PORT structures.
 */

#define PORT struct _tag_port

struct _tag_port {
    void *driver;
    PORT *next_port;
    int handle;
    int status;
    DRIVER_TYPE driver_type;
    int dialing_method;
```

COMMLIB.H

```
    unsigned int count;
    int ( GF_CONV * read_char )( PORT *port );
    int ( GF_CONV * peek_char )( PORT *port );
    int ( GF_CONV * write_char )( PORT *port, int c );
    int ( GF_CONV * port_close )( PORT *port );
    int ( GF_CONV * port_set )( PORT *port,
                                long baud_rate,
                                char parity,
                                int word_length,
                                int stop_bits );
    int ( GF_CONV * use_xon_xoff)( PORT *port, int control );
    int ( GF_CONV * use_rts_cts )( PORT *port, int control );
    int ( GF_CONV * use_dtr_dsr )( PORT *port, int control );
    int ( GF_CONV * set_dtr )( PORT *port, int control );
    int ( GF_CONV * set_rts )( PORT *port, int control );
    long ( GF_CONV * space_free_in_TX_buffer )( PORT *port );
    long ( GF_CONV * space_used_in_TX_buffer )( PORT *port );
    long ( GF_CONV * space_free_in_RX_buffer )( PORT *port );
    long ( GF_CONV * space_used_in_RX_buffer )( PORT *port );
    int ( GF_CONV * clear_TX_buffer )( PORT *port );
    int ( GF_CONV * write_buffer )( PORT *port,
                                    char *buffer,
                                    unsigned int count );
    int ( GF_CONV * read_buffer )( PORT *port,
                                   char *buffer,
                                   unsigned int count );
    int ( GF_CONV * dump_port_status )( PORT *port,
                                        PORT_DUMPER printer );
    int ( GF_CONV * send_break )( PORT *port,
                                  int milliseconds );
    int ( GF_CONV * get_modem_status )( PORT *port );
    int ( GF_CONV * get_line_status )( PORT *port );
    int ( GF_CONV * clear_line_status)( PORT *port );
    int ( GF_CONV * block )( PORT *port, int control );
    void ( GF_CONV * clear_error )( PORT *port );
    void GF_FAR *user_data;
    struct GFINSTANCEDATAtag far *lpThis;
};

#undef PORT

typedef struct _tag_port PORT;

/* The GFINSTANCEDATAtag structure below is used for PowerComm onl
y.
 * A pointer to this structure has been added to the PORT structur
e
 * for internal use.
 */

struct GFINSTANCEDATAtag {
```

COMMLIB.H

```
    int ( GF_CONV * _PortIdleFunctionPtr )( PORT GF_DLL_FAR *port
);
    int ( GF_CONV * _AbortModemFunctionPtr )( PORT GF_DLL_FAR *por
t );
    void * ( GF_CONV GF_DLL_FAR * _XferFileOpenFunctionPtr )(
                        void GF_DLL_FAR *status,
                        char GF_DLL_FAR *name,
                        char GF_DLL_FAR *mode );
    int ( GF_CONV * _AbortXferFunctionPtr )( void GF_DLL_FAR *stat
us );
    int _DefaultAbortKey;
    char GF_DLL_FAR * ( GF_CONV *_UserErrorNameFunctionPtr )(
                        int error_code );
    TRIGGER_LEVEL Default16550TriggerLevel;
    TRIGGER_LEVEL DefaultFast16550TriggerLevel;
    int hm_delay_value;
    char far GF_DLL_FAR *hm_match_string;
    void ( GF_CONV GF_DLL_FAR *hm_character_printer )( char c );
    int _hm_abort_key;
    int _aserror;
#ifdef GF_WINDOWS
    HTASK hTask;
#else
    int hTask;
#endif
    int nRefCount;
};

typedef struct GFINSTANCEDATAtag GFINSTANCEDATA;
typedef GFINSTANCEDATA far * LPGFINSTANCEDATA;
LPGFINSTANCEDATA GetGFInstanceDataPtr( void );

/*
 * The following macros define pseudo-functions.  These are all th
e
 * virtual functions defined in the PORT structure.  The macros ju
st
 * make it easier to access the functions without worrying about t
he
 * port structure.
 */
#define ReadChar( p )                  p->read_char( p )
#define PeekChar( p )                  p->peek_char( p )
#define WriteChar( p, c )              p->write_char( p, c )
#define PortClose( p )                 p->port_close( p )
#define PortSet( p, b, py, wl, sb ) p->port_set( p, b, py, wl, sb
)
#define UseXonXoff( p, c )             p->use_xon_xoff( p, c )
#define UseRtsCts( p, c )              p->use_rts_cts( p, c )
#define UseDtrDsr( p, c )              p->use_dtr_dsr( p, c )
#define DumpPortStatus( p, f )         p->dump_port_status( p, f )
```

COMMLIB.H

```
#define SetDtr( p, c )                  p->set_dtr( p, c )
#define SetRts( p, c )                  p->set_rts( p, c )
#define SpaceFreeInTXBuffer( p )        p->space_free_in_TX_buffer( p
)
#define SpaceFreeInRXBuffer( p )        p->space_free_in_RX_buffer( p
)
#define SpaceUsedInTXBuffer( p )        p->space_used_in_TX_buffer( p
)
#define SpaceUsedInRXBuffer( p )        p->space_used_in_RX_buffer( p
)
#define ClearTXBuffer( p )              p->clear_TX_buffer( p )
#define WriteBuffer( p, b, i )          p->write_buffer( p, b, i )
#define ReadBuffer( p, b, i )           p->read_buffer( p, b, i )
#define SendBreak( p, t )               p->send_break( p, t )
#define GetModemStatus( p )             p->get_modem_status( p )
#define GetLineStatus( p )              p->get_line_status( p )
#define ClearLineStatus( p )            p->clear_line_status( p )
#define Block( p, c )                   p->block( p, c )
#define ClearError( p )                 p->clear_error( p )

#ifdef __cplusplus
extern "C" {
#endif

int                 GF_CONV CalculateBlockCRC16( unsigned int count,
                                                  unsigned int startv
alue,
                                                  void *buffer );
int                 GF_CONV CalculateCharacterCRC16( unsigned int cr
c,
                                                      unsigned char c
 );
unsigned long       GF_CONV  CalculateBlockCRC32( unsigned int count
,
                                                   unsigned long star
tvalue,
                                                   void *buffer );
unsigned long       GF_CONV CalculateCharacterCRC32( unsigned long c
rc,
                                                      unsigned char c
 );
void                GF_CDECL _assti( void );
void                GF_CDECL _ascli( void );
int                 GF_CDECL _asinb( unsigned io_address );
int                 GF_CDECL _asoutb( unsigned io_address, int value
 );
int                 GF_CONV  asitime( void );
long                GF_CONV _asgetdivisor( unsigned io_address, int
ier_mask );

/*
```

COMMLIB.H

```
 * This function is also used in Data Windows.  We don't define it
 * twice so as to not get a compiler error.
 */
#if !defined( DW_DOT_H )
unsigned          GF_CDECL machine( void );
#endif

void              GF_CONV  timer( unsigned ticks );
int               GF_CONV  submodel( void );
char *            GF_CONV CommErrorName( int error_code );
char *            GF_CONV AsciiControlCharacterName( int c );
int               GF_CONV Change8259Priority( int irq );
int               GF_CONV IsMicroChannel( void );
unsigned int      GF_CONV get_bios_segment( void );
long              GF_CONV ElapsedTime( void );
int               GF_CONV PortKillTime( PORT *port, long milliseco
nds );
int               GF_CONV DESQViewRunning( void );
int               GF_CONV WindowsEnhancedMode( void );
void              GF_CONV YieldWindowsTimeSlice( void );
void              GF_CONV YieldDESQViewTimeSlice( void );


int GF_CONV GetDsr( PORT *p );
int GF_CONV GetCd( PORT *p );
int GF_CONV GetRi( PORT *p );
int GF_CONV GetCts( PORT *p );
int GF_CONV GetParityError( PORT *p );
int GF_CONV GetOverrunError( PORT *p );
int GF_CONV GetFramingError( PORT *p );
int GF_CONV GetBreakDetect( PORT *p );
int GF_CONV WriteString( PORT *p, char *string, int termination_se
quence );
int GF_CONV WriteStringTimed( PORT *p, char *string,
                              int termination_sequence,
                              long milliseconds );
int GF_CONV WriteBufferTimed( PORT *p, char *buffer, unsigned int
count,
                              long milliseconds );
int GF_CONV ReadCharTimed( PORT *p, long milliseconds );
int GF_CONV WriteCharTimed( PORT *port, int c, long milliseconds )
;
int GF_CONV ReadBufferTimed( PORT *port, char *buffer,
                             unsigned int count, long milliseconds
 );
int GF_CONV ReadString( PORT *port, char *buffer,
                        unsigned int size, int termination_sequenc
e );
int GF_CONV ReadStringTimed( PORT *port, char *buffer,
                             unsigned int size,
```

COMMLIB.H

```
                              int termination_sequence,
                              long milliseconds );
int GF_CONV ClearRXBuffer( PORT *port );
int GF_CONV IsTXEmpty( PORT *port );
int GF_CONV IsRXEmpty( PORT *port );
int GF_CONV IsTXFull( PORT *port );
int GF_CONV IsRXFull( PORT *port );

PORT * GF_CONV PortOpenFossil( int port_number, long baud_rate, ch
ar parity,
                               int word_length, int stop_bits );

PORT * GF_CONV PortOpenSmartDigiboard( int port_number, long baud_
rate,
                                       char parity, int word_lengt
h,
                                       int stop_bits  );

PORT * GF_CONV PortOpenGreenleaf( int port_number, long baud_rate,
                                  char parity, int word_length,
                                  int stop_bits );

PORT * GF_CONV PortOpenGreenleafPolled( int port_number, long baud
_rate,
                                        char parity, int word_leng
th,
                                        int stop_bits  );

PORT * GF_CONV PortOpenModemAssist( int port_number, long baud_rat
e,
                                    char parity, int word_length,
                                    int stop_bits );

#if defined(DOSX286)
#define PortOpenGreenleafFast PortOpenPharLap286
#elif defined(DOS16M)
#define PortOpenGreenleafFast PortOpenDos16M
#endif

PORT * GF_CONV PortOpenGreenleafFast( int port_number, long baud_r
ate,
                                      char parity, int word_length
,
                                      int stop_bits  );
PORT * GF_CONV PortOpenBIOS( int port_number, long baud_rate,
                             char parity, int word_length,
                             int stop_bits  );

PORT * GF_CONV PortOpenExtendedBIOS( int port_number, long baud_ra
te,
                                     char parity, int word_length,
```

COMMLIB.H

```
                                    int stop_bits  );

PORT * GF_CONV PortOpenSparkle( int port_number, long baud_rate,
                                char parity, int word_length,
                                int stop_bits  );

PORT * GF_CONV PortOpenSmartArnet( int port_number, long baud_rate
,
                                   char parity, int word_length,
                                   int stop_bits  );

PORT * GF_CONV PortOpenSmartStarGate( int port_number, long baud_r
ate,
                                      char parity, int word_length
,
                                      int stop_bits  );

#ifdef GF_WINDOWS
PORT * GF_CONV PortOpenMSWindows( int port_number, long baud_rate,
                                  char parity, int word_length,
                                  int stop_bits
                                  );

#endif

void GF_CONV SetPortIdleFunctionPtr( int (GF_CONV *f)( PORT *port)
 );
void GF_CONV SetUserErrorNameFunctionPtr( char *(GF_CONV *f)( int
error ) );
void GF_CONV SetAbortModemFunctionPtr( int (GF_CONV *f)( PORT *por
t) );
#ifdef VGFD
int InitGreenleaf( void );
#endif

#ifdef __cplusplus
}
#endif

/*
 * Things after this point are all in place in order to have compa
tibility
 * with earlier versions of the CommLib.  Feel free to delete ever
ything
 * from here down if you are not using any of the old function nam
es.
 */

/*
 *
 */
```

COMMLIB.H

```
#define OFF             0
#define ON              1

#define glcrc( l, c, b )        CalculateBlockCRC16( l, c, b )
#ifdef COMPAT30
#if COMPAT30 > 0
#error Compatibility with the 3.0 version of CommLib is no longer
supported!
#endif
#endif

#ifndef KEEP_OBSOLETE_FUNCTIONS
#define KEEP_OBSOLETE_FUNCTIONS 1
#endif

#endif /* #ifndef COMMLIB_DOT_H */
```

COMPILER.H

```
#ifndef _COMPILER_DOT_H
#define _COMPILER_DOT_H

/*
 * COMPILER.H Version 1.10
 *
 * DESCRIPTION
 *
 * This is the header file used by library files to determine
 * compiler/model dependent information.  The compiler-dependent
 * information has in the past been found in a file called GF.H,
 * which also included a few macros, constants, and type definitio
ns.
 *
 *  Copyright (C) 1991-92 Greenleaf Software Inc.  All Rights Rese
rved.
 *
 * MODIFICATIONS
 *
 * December 12, 1992  : Released with CommLib 4.0
 */

#ifndef GF_BLANK
#define GF_BLANK
#endif

#if defined(__TURBOC__) && !defined(__BORLANDC__)
  #if ( __TURBOC__ <= 0x201 )
    #define GF_COMPILER_NAME "Turbo C"
    #define GF_TURBO_C
    #define GF_COMPILER_VERSION __TURBOC__
    #define GF_CDECL cdecl
    #define GF_CONV GF_BLANK
    #define ANSI_PROTOTYPES
    #define GF_INTERRUPT interrupt
    #define GF_UNUSED_PARAMETER( a ) (void) a
    #define GF_FAR far
    #ifdef __SMALL__
    #endif
    #ifdef __MEDIUM__
        #define _LCODE 1
    #endif
    #ifdef __COMPACT__
        #define _LDATA 1
    #endif
    #ifdef __LARGE__
        #define _LCODE 1
        #define _LDATA 1
    #endif
    #ifdef __HUGE__
        #define _LCODE 1
```

COMPILER.H

```
        #define _LDATA 2
        #define _HUGE 1
    #endif
/* End of Turbo C */

  #else  /* !( __TURBOC__  < 0x201 ) */
    #define GF_COMPILER_NAME "Turbo C++"
    #define GF_TURBO_CPP
    #define GF_COMPILER_VERSION __TURBOC__
    #define GF_CDECL cdecl
    #define GF_CONV GF_BLANK
    #define ANSI_PROTOTYPES
    #define GF_INTERRUPT interrupt
    #define GF_UNUSED_PARAMETER( a ) (void) a
    #define GF_FAR far
    #ifdef __SMALL__
    #endif
    #ifdef __MEDIUM__
        #define _LCODE 1
    #endif
    #ifdef __COMPACT__
        #define _LDATA 1
    #endif
    #ifdef __LARGE__
        #define _LCODE 1
        #define _LDATA 1
    #endif
    #ifdef __HUGE__
        #define _LCODE 1
        #define _LDATA 2
        #define _HUGE 1
    #endif
  #endif /* ?__TURBOC__ > 0x201 */
/* End of Turbo C++ */

#elif defined(__TURBOC__) && defined(__BORLANDC__)   /* Borland C+
+ */
    #define GF_COMPILER_NAME "Borland C++"
    #define GF_BORLAND_CPP
    #define GF_COMPILER_VERSION __BORLANDC__
    #define GF_CDECL cdecl
#if ( __BORLANDC__ >= 0x300 )
    #define GF_CONV _cdecl
#else
    #define GF_CONV GF_BLANK
#endif
    #define ANSI_PROTOTYPES
    #define GF_INTERRUPT interrupt
    #define GF_UNUSED_PARAMETER( a ) (void) a
    #define GF_FAR _far
    #ifdef _Windows
```

COMPILER.H

```
        #define GF_WINDOWS
        #define GF_DLL_FAR _far
    #endif
    #ifdef __SMALL__
    #endif
    #ifdef __MEDIUM__
        #define _LCODE 1
    #endif
    #ifdef __COMPACT__
        #define _LDATA 1
    #endif
    #ifdef __LARGE__
        #define _LCODE 1
        #define _LDATA 1
    #endif
    #ifdef __HUGE__
        #define _LCODE 1
        #define _LDATA 2
        #define _HUGE 1
    #endif
/* End of Borland C++ */

/* I think that just adding the loadds statement will make
   all my ASM routines work properly with Watcom C */

#elif defined(__WATCOMC__) && !defined(__386__)
    #include <stddef.h>
    #define GF_COMPILER_NAME "Watcom C"
    #define GF_WATCOM_C
    #define GF_COMPILER_VERSION 900
    #define GF_CDECL _cdecl __loadds
    #define GF_CONV GF_BLANK
    #define ANSI_PROTOTYPES
    #define GF_INTERRUPT interrupt _cdecl
    #define GF_UNUSED_PARAMETER( a ) (void) a
    #define GF_FAR _far
    #ifdef M_I86SM
    #endif
    #ifdef M_I86MM
        #define _LCODE 1
    #endif
    #ifdef M_I86CM
        #define _LDATA 1
    #endif
    #ifdef M_I86LM
        #define _LCODE 1
        #define _LDATA 1
    #endif
/* End of Watcom C */

#elif defined(__WATCOMC__) && defined(__386__)
```

COMPILER.H

```
    #include <stddef.h>
    #define GF_COMPILER_NAME "Watcom C"
    #define GF_WATCOM_C_386
    #define GF_COMPILER_VERSION 900
    #define GF_CDECL _cdecl
    #define GF_CONV GF_BLANK
    #define ANSI_PROTOTYPES
    #define GF_INTERRUPT interrupt _cdecl
    #define GF_UNUSED_PARAMETER( a ) (void) a
    #define GF_FAR far
    #ifdef M_I86SM
    #endif
    #ifdef M_I86MM
        #define _LCODE 1
    #endif
    #ifdef M_I86CM
        #define _LDATA 1
    #endif
    #ifdef M_I86LM
        #define _LCODE 1
        #define _LDATA 1
    #endif
/* End of Watcom C 386 */

#elif defined(__HIGHC__)
    #define GF_COMPILER_NAME "High C"
    #define GF_HIGH_C
    #define GF_COMPILER_VERSION 300
    #define GF_CDECL GF_BLANK
    #define GF_CONV GF_BLANK
    #define ANSI_PROTOTYPES
    #define GF_INTERRUPT interrupt cdecl
    #define GF_UNUSED_PARAMETER( a ) (void) a
    #define GF_FAR _Far
    #define far _Far
    #ifdef M_I86SM
    #endif
    #ifdef M_I86MM
        #define _LCODE 1
    #endif
    #ifdef M_I86CM
        #define _LDATA 1
    #endif
    #ifdef M_I86LM
        #define _LCODE 1
        #define _LDATA 1
    #endif
/* End of MetaWare High C 386 */

#elif defined( __ZTC__ )                    /* Zortech C/C++
 */
```

COMPILER.H

```
    #define GF_COMPILER_NAME "Zortech C/C++"
    #define GF_ZORTECH_CPP
    #define GF_COMPILER_VERSION __ZTC__
    #define GF_CDECL cdecl
    #define GF_CONV GF_BLANK
    #define ANSI_PROTOTYPES
    #define GF_INTERRUPT GF_BLANK
    #define GF_UNUSED_PARAMETER( a ) (void) a
    #define GF_FAR _far
    #ifdef _WINDOWS
      #define GF_WINDOWS
      #define GF_DLL_FAR _far
    #endif
    #ifdef M_I86SM
    #endif
    #ifdef M_I86MM
        #define _LCODE 1
    #endif
    #ifdef M_I86CM
        #define _LDATA 1
    #endif
    #ifdef M_I86LM
        #define _LCODE 1
        #define _LDATA 1
    #endif
    #ifdef M_I86VM
        #define _LCODE 1
        #define _LDATA 1
    #endif
/* End of Zortech C/C++ */

#elif defined( __TSC__ )                        /* TopSpeed C */
    #define GF_COMPILER_NAME  "TopSpeed C"
    #define GF_TOPSPEED_C
    #define GF_COMPILER_VERSION __TSC__
    #define GF_CDECL cdecl
    #define GF_CONV GF_BLANK
    #define ANSI_PROTOTYPES
    #define GF_INTERRUPT interrupt
    #define GF_UNUSED_PARAMETER( a ) if ( a != a ) a = 0
    #define GF_FAR far
    #if defined( M_I86SM )
    #elif defined( M_I86MM )
        #define _LCODE 1
    #elif defined( M_I86CM )
        #define _LDATA 1
    #elif defined( M_I86LM )
        #define _LCODE 1
        #define _LDATA 1
    #elif defined( M_I86MTM )
        #define _LCODE 1
```

COMPILER.H

```
        #define _LDATA 1
    #elif defined( M_I86XM )
        #define _LCODE 1
        #define _LDATA 1
        #define _HUGE 1
    #else
        #error Unsupported Topspeed memory model!
    #endif
/* End of TopSpeed C/C++ */

#elif defined(M_I86) && defined(MSDOS)
    #define GF_COMPILER_NAME "Microsoft C"
    #define GF_MICROSOFT_C
    #if ( _MSC_VER >= 600 )
        #define GF_COMPILER_VERSION _MSC_VER
        #define GF_CDECL _cdecl
        #ifdef _WINDOWS
          #define GF_CONV   _cdecl
          #define GF_WINDOWS
          #define GF_DLL_FAR _far
        #else
          #define GF_CONV   _fastcall
        #endif
        #define ANSI_PROTOTYPES
        #define GF_INTERRUPT interrupt far
        #define GF_UNUSED_PARAMETER( a )    (a = a)
        #define GF_FAR _far
    #else
        #define GF_COMPILER_VERSION 510
        #define GF_CDECL GF_BLANK
        #define GF_CONV GF_BLANK
        #define ANSI_PROTOTYPES
        #define GF_INTERRUPT interrupt far
        #define GF_UNUSED_PARAMETER( a )    (a = a)
        #define GF_FAR far
    #endif
    #if defined( M_I86SM )
    #elif defined( M_I86MM )
        #define _LCODE 1
    #elif defined( M_I86CM )
        #define _LDATA 1
    #elif defined( M_I86LM )
        #define _LCODE 1
        #define _LDATA 1
    #else
    #error Unsupported Microsoft C memory model!
    #endif
#endif                                          /* Microsoft C
        */

#ifndef GF_COMPILER_NAME
```

COMPILER.H

```
#error This is an unknown compiler!
#endif
#ifndef GF_WINDOWS
#define GF_DLL_FAR
#endif

#endif  /* #ifdef _COMPILER_DOT_H */
```

MULTPORT.H

```
#ifndef _MULTPORT_DOT_H
#define _MULTPORT_DOT_H

/*
 * MULTPORT.H          4.00A  December 12, 1992
 *
 * The Greenleaf Comm Library
 *
 * Copyright (C) 1984-92 Greenleaf Software Inc.  All Rights Reser
ved.
 *
 * NOTES
 *
 *  This header file contains all the function prototypes, definit
ions,
 *  etc. needed to use any of the GSCI Level 1 multiport board ins
tallation
 *  functions.
 *
 * MODIFICATIONS
 *
 * December 12, 1992  4.00A : Initial release
 *
 */

#ifdef __cplusplus
extern "C" {
#endif

int GF_CONV InstallStandardMCADigiboard( int board_number,
                                         int first_port_number );
int GF_CONV RemoveStandardMCADigiboard( int board_number );

int GF_CONV InstallStandardDigiboard( int irq,
                                      int shared_status_port,
                                      int first_port_number,
                                      int port_count,
                                      int port_addresses[] );
int GF_CONV RemoveStandardDigiboard( int irq );

int GF_CONV InstallStandardStargate( int irq,
                                     int first_port_number,
                                     int first_port_address );
int GF_CONV RemoveStandardStargate( int irq );

int GF_CONV InstallStandardQuaTech( int irq,
                                    int first_port_number,
                                    int first_port_address );
int GF_CONV RemoveStandardQuaTech( int irq );

int GF_CONV InstallStandardFastcom4( int irq,
```

MULTPORT.H

```
                                        int first_port_number,
                                        int first_port_address );
int GF_CONV RemoveStandardFastcom4( int irq );

int GF_CONV InstallStandardBocaBoard( int irq,
                                      int first_port_number,
                                      int port_count,
                                      int first_port_address );
int GF_CONV RemoveStandardBocaBoard( int irq );

int GF_CONV InstallStandardHostessBoard( int irq,
                                         int first_port_number,
                                         int port_count,
                                         int first_port_address );
int GF_CONV RemoveStandardHostessBoard( int irq );

int GF_CONV InstallStandardSeaLevel( int irq,
                                          int first_port_number,
                                          int port_count,
                                          int first_port_address )
;
int GF_CONV RemoveStandardSeaLevel( int irq );

int GF_CONV InstallStandardAst( int irq,
                                int first_port_number,
                                int first_port_address );
int GF_CONV RemoveStandardAst( int irq );

int GF_CONV InstallStandardContec( int irq,
                                   int first_port_number,
                                   int first_port_address );
int GF_CONV RemoveStandardContec( int irq );

int GF_CONV InstallStandardArnet( int irq,
                                  int shared_status_port,
                                  int first_port_number,
                                  int port_count,
                                  int first_port_address );
int GF_CONV RemoveStandardArnet( int irq );

#ifdef __cplusplus
}
#endif

#endif /* #ifndef _MULTPORT_DOT_H */
```

SIMPLEIO.H

```
/* simpleio.h */

#define UCHR    unsigned char
#define UINT    unsigned int
#define NORM_COLOR      0x1F
#define NORM_B_W        0x07
#include <bios.h>
#define keyready()  _bios_keybrd(_KEYBRD_READY)

void scroll(UCHR);
void check_video(void);
extern void VideoID(struct vid _near *);
void dos_cursor(UCHR, UCHR);
void show_title(char *);
void beep(void);
void send_txt(char *);
char *get_str(char *);
int  fullkey(void);
void clear_screen(void);
```

SSU.H

```
/* ssu.h */
/*#define DEBUG          */
#define UCHR                      unsigned char
#define MAX_FILES                 4              /* maximum number
of nested include files */
#define MAX_EVENTS                100            /* number of exter
nal switches */
#define MAX_VARS                  200            /* number of varia
bles  */
#define MAX_TEMP_VARS   450               /* number of temp vars ava
ilable */
#define MAX_TIMERS                100            /* number of timer
s available */
#define MAX_SCENES                250            /* number of scene
s available */
#define MAX_RULES                 1000    /* number of rules that ca
n be defined */
#define MAX_ALIASES               250            /* number of alias
es that can be defined */
#define MAX_ALIAS_LEN   100               /* max length of an alias
string */
#define MAX_MIDI_CMDS   100               /* max number of MIDI comm
ands available */
#define MAX_MIDI_PORTS  8
#define MIDI_IRQ                  IRQ3
#define MIDI_BASE_PORT  0x180
#define MIDI_BASE_COM   COM14
#define MIDI_BAUD_RATE  4800L
#define MIDI_NOTE_ON                      0x90           /* MIDI co
mmands */
#define MIDI_NOTE_OFF                     0x80
#define MIDI_PROGRAM_CHANGE               0xC0
#define MIDI_CONTROLLER                   0xB0
#define MIN_LABEL                 1
#define MAX_LABEL                 999
#define MAX_LABELS                100     /* max number of labels av
ailable */
#define MAX_REAL_TIMES  8
#define EVENT_BASE                21000
#define VARIABLE_BASE   22000
#define TEMP_OFFSET               MAX_VARS               /* upper 1
/2 of variables are temp */
#define TIMER_BASE                23000
#define SCENE_BASE                24000
#define PRIORITY_BASE   25000
#define DURATION_BASE   26000                    /* only need one p
er mix machine */
#define NON_REPEAT_BASE 26100                    /*   ditto */
#define LABEL_BASE                27000
#define REAL_TIME_BASE  28000
#define MAX_BASE                  29000
```

SSU.H

```
#define CLOCK_VAR                   31000
#define DAY_VAR                     31001
#define MAX_STR_LEN                 60
#define PREV_BIT                    0x8000
#define PREVIOUS(x)                 (x+PREV_BIT)
#define MAX_CREATURES   8
#define MAX_OUTPUTS                 (MAX_CREATURES+MAX_MIDI_PORTS)
#define FILE_SIZE                   20
#define MAX_ID                      20
#define FPS                                 30
#define MAX_STR                     250
#define SYMBOL_STR_LEN  10                  /* size that a symbol stri
ng can be max */
#define LEFT_MARG                   2
#define PROMPT_LEN                  9
#define REAL_TIME_LINE  19
#define CMD_STR_LINE    20
#define QUERY_LINE                  21
#define PRIORITY_LINE   22
// also uses line 23...
#define REPORT_LINE                 24
#define BAUD_RATE                   19200L
#define PARITY                      'N'
#define WORD_LENGTH                 8
#define STOP_BITS                   1
#define START_PORT                  COM5
#define MAX_EXT                     96
#define IO_BASE                     0x360           /* all OMEGA board
s start here, addl bds are +4 */
#define LOWEST_PRIORITY 0
#define LOOP_DELAY                  110                         /*
 in milliseconds */
#define ALL_STOP        -1
#define ALL_GO                      -2
#define NUM_OPERATORS   13
#define OPERATOR_BOUNDARY           5                   /* last AS
SIGN operqator */
#define ALL_CYCLE                   -3
#define LOAD_GAME_CMD   -4
#define ELSE_TOKEN                  "ELSE"
#define CONT_LINE                   '\\'

/* pre-processor commands */
#define ALIAS                       1
#define ALIAS_STR                   "DEFINE"
#define LABEL                       2
#define LABEL_STR                   "LABEL"
#define INCLUDE                     3
#define INCLUDE_STR                 "INCLUDE"

/* error codes */
```

SSU.H

```
#define VAR_ERR                 1
#define TIMER_ERR               2
#define SCENE_ERR               3
#define PRIORITY_ERR    4
#define DURATION_ERR    5
#define EVENT_ERR               6
#define INCOMPLETE_ERR  7
#define ILLEGAL_OPERATOR        8
#define ALIAS_ERR               9
#define ALIAS_TOO_LONG  10
#define UNDEF_DEF               11
#define NO_ALIAS_MEM    12
#define TOO_MANY_ALIASES        13
#define LABEL_ERR               14
#define REAL_TIME_ERR   15
#define NON_REPEAT_ERR  16
#define LEFT_PAREN_ERR  17
#define RIGHT_PAREN_ERR 18
#define ELSE_ERROR              19
#define ILLEGAL_ASSIGN  20
#define ILLEGAL_LOGICAL 21
#define SYNTAX_ERROR    22
#define INCLUDE_ERR             23

#define NUM_ERRORS              24

#ifdef ONCE
char    _far *error_desc[NUM_ERRORS] = {        /* text that goes
 along with error codes above */
        "",
        "Illegal variable",
        "Illegal timer",
        "Illegal scene",
        "Illegal priority",
        "Illegal duration",
        "Illegal event",
        "Incomplete rule",
        "Illegal operator",
        "Alias error",
        "Alias too long",
        "Undefined alias",
        "No alias memory",
        "Too many aliases",
        "Label error",
        "Real time error",
        "Illegal non-repeat index",
        "Missing left paren",
        "Missing right paren",
        "ELSE token error",
        "Illegal assignment operator",
        "Illegal logical operator",
```

SSU.H

```
        "Syntax error",
        "Include file error"
        };
#else
extern char     _far *error_desc[NUM_ERRORS];          /* text that
 goes along with error codes above */
#endif


#define COMMENT_STRING  "REM"
#define PRE_PROCESS_TAG '#'
#define ALIAS_TAG                '_'
#define TRUE                     1
#define FALSE                    0
#define YES                              1
#define NO                               0

/* symbol set */
#define NOP                              0                /* undefin
ed or 0, forces logic TRUE */
#define ADD                              1                /* + */
#define SUBTRACT                 2       /* - */
#define SET                              3        /* * */
#define ALL_SET                  4                /* ! */
#define POINTER                  5                /* % */

#define EQ                               6        /* = */
#define AND                              7        /* & */
#define OR                               8        /* | */
#define GT                               9                /* > */
#define LT                               10               /* < */
#define CHANGES_TO               11      /* ^ */
#define NE                               12               /* # */

#define ESC                              27
#define BACKSPACE                8
#define ENTER                    13

#define TAB                              '\t'

int             scenes;                                   /* actual
number of scenes */
int             demo;                                     /* TRUE if
 demo mode, no real I/O occurs */
int             str_pos;                                  /* cursor
position in command line on screen */
int             old_str_pos;                              /* cursor
position in command line on screen */
char    cmd_str[MAX_STR_LEN];   /* storage for command line on scr
een */
char    old_cmd_str[MAX_STR_LEN];    /* storage for command line on
```

SSU.H

```
 screen */
int             num_ext;                                    /* number
of external switch events */
char    bfr[80];
int             num_rules;              /* number of rules defined
 */
int             num_events;             /* number of events define
d */
int             num_aliases;    /* number of aliases defined */
int             num_labels;             /* number of labels define
d */
int             num_midi_cmds;  /* number of MIDI commands defined
 */
int             last_temp_var;
int             real_time[MAX_REAL_TIMES];
int             goto_rule;              /* set to rule number to g
oto if LABEL statement evals TRUE */
char    *alias_from[MAX_ALIASES];
char    *alias_to[MAX_ALIASES];
char    cur_game[20];

struct label_def
        {
        int             number;
        int             rule;
        } label[MAX_LABELS];


struct mix_def
        {
        int             priority;
        int             prev_priority;
        long    duration;
        long    prev_duration;
        } mix[MAX_OUTPUTS];

struct rule_def
        {
        int             label;                              /* valid n
umbers are 1-999 */
        int             dependent;
        int             operation;                          /* a symbo
l */
        int             value;
        int             condition;                          /* a symbo
l */
        int             var1;
        int             var2;
        int             else_dependent;
        int             else_operation;
        int             else_value;
```

SSU.H

```
        }       rule[MAX_RULES+1];

struct midi_cmds_def
        {
        int     num;            // user-specifed command number in
 MIDI file, referenced in scene
        int     cmd;            // actual MIDI command, includes e
mbedded channel
        int     value;      // note number or program change numbe
r
        int     velocity;       // velocity of note on or off
        } midi_cmd[MAX_MIDI_CMDS+1];


struct scene_def
        {
        int             mix[MAX_CREATURES];
        int             midi[MAX_MIDI_PORTS];
        int             priority;
        long    duration;                       /* duration in ms
of event */
        long    non_repeat;
        long    current_non_repeat;
        long    spool_time;
        long    current_spool_time;
        char    *macro;
        char    id[100];
        } scene[MAX_SCENES+1];


/*                      logic symbol            internal represent
aion  storage */
/*                      01-0999                         ;integer 1
 - 999          int             */
/*                      E1-E100 events          ;integer 1000-1100
 */     int             event[MAX_EVENTS+1];
/*                      V1-V100 variables   ;integer 2000-2199 */
 int            Variable[(MAX_VARS+1)+(MAX_TEMP_VARS+1)];
/*                      T1-T100 timers          ;integer 3000-3199
 */   int               Timer[MAX_TIMERS+1];
/*                      S1-S999 scenes          ;integer 4000-4999
 */   int       exe_scene[MAX_SCENES+1];

                                        int             prev_event
[MAX_EVENTS+1];

                                        int             prev_timer
[MAX_TIMERS+1];

                                        int          prev_variable[
```

SSU.H

```
(MAX_VARS+1)+(MAX_TEMP_VARS+1)];
                                          int            prev_run_s
cene[MAX_SCENES+1];

void    init_system(void);
int             get_scene_line(void);
int             get_midi_line(void);
struct rule_def         *xlat_rule(char *, int *);
void    show_priorities(void);
int             open_scene_file(char *);
int             open_midi_file(char *);
int             open_rules_file(char *);
FILE    *file_open(char *);
void    file_close(int);
void    get_rule_line(char *);
void    rule_line(char *, int *);
void    pre_process_line(char *, int *);
void    make_rule(struct rule_def *);
int             get_var(char *, int *);
int             open_com_ports(void);
void    close_com_ports(void);
int             open_midi_ports(void);
void    close_midi_ports(void);
void    show_screen(void);
void    main_loop(void);
void    check_ext_interrupt(void);
void    run_scene(int, int, int);
void    report(int, int, int);
void    display_rule_error(int);
void    display_pre_process_error(int);
void    error_msg(char *);
void    display_line(char *);
void    debounce_delay(void);
void    stop_system(void);
void    go_system(void);
void    cycle_system(void);
void    send_str(int, char*);
void    decrement_counters(void);
void    set_value(int, int);
int             get_value(int);
int             get_index(int);
int             get_array_size(int);
int             load_game(char *);
void    set_dependent(int, int, int);
int             test_condition(int, int, int);
void    copy_vars(void);
void    decrement_counters(void);
int             run_rule(struct rule_def *);
void    run_scenes(void);
```

SSU.H

```
void     test_rules(void);
void     read_states(void);
int              xlat_symbol(char *, int *);
int              xlat_operator(char*, int *, int);
void     run_str(void);
void     display_string(char *);
void     show_data(char *);
int              quick_rule(char *, int *);
void     run_command(char *);
void     read_keyboard(void);
void     exit_program(char *);
void     display_cmd_string(void);
void     show_game(void);
char     *expand_symbol(int, char *);
int              all_blank(char *);
void     init_hrt(void);
void     hrt_close(void);
void     wait_frame(void);
char     *syntax_error_msg(int);
void     check_env(void);
void     pre_process(char *, int *);
int              xlat_pp_cmd(char *, int *);
char     *xlat_alias(char *);
char     *get_alias(char *);
void     clear_vars(void);
void     add_label(int, int);
void     show_real_time(void);
int              get_line(char *);
void     clear_system(void);
void     clear_memory(void);
void     send_midi(int, int);
int              get_midi_cmd_index(int);
void     display_midi_error(int);
int      time_in_minutes(void);
int      day_of_week(void);
```

HRTIMER.C

```
/* hrt.c new mnt version */
#include <stdio.h>
#include <stdlib.h>

typedef unsigned long   U32;

/*
**      constants for ticklet to second conversions
**      ticklet to microsecond: error < 1.3e-07 (one part in seven
 million)
**              max cut value 40,904,449
**      microsecond to ticklet: error < 1.3e-07 (one part in seven
 million)
**              max cut value 48,806,446
**      ticklet to millisecond: error < 1.3e-07 (one part in seven
 million)
**              max cut value 327,235
**      millisecond to ticklet: error < 1.3e-07 (one part in seven
 million)
**              max cut value 390,450,852
*/
#define T2USEC_NUMERATOR        88
#define T2USEC_DENOMINATOR      105
#define T2USEC_MAX_IN           48806445

#define USEC2T_NUMERATOR        105
#define USEC2T_DENOMINATOR      88
#define USEC2T_MAX_IN           40904450

#define T2MSEC_NUMERATOR        11
#define T2MSEC_DENOMINATOR      13125
#define T2MSEC_MAX_IN           390451572

#define MSEC2T_NUMERATOR        13125
#define MSEC2T_DENOMINATOR      11
#define MSEC2T_MAX_IN           327235

#define T2USEC(i)       (ratio_conversion((i), T2USEC_NUMERATOR, \
                                T2USEC_DENOMINATOR, T2USEC
_MAX_IN))

#define USEC2T(i)       (ratio_conversion((i), USEC2T_NUMERATOR, \
                                USEC2T_DENOMINATOR, USEC2T
_MAX_IN))

#define T2MSEC(i)       (ratio_conversion((i), T2MSEC_NUMERATOR, \
                                T2MSEC_DENOMINATOR, T2MSEC
_MAX_IN))

#define MSEC2T(i)       (ratio_conversion((i), MSEC2T_NUMERATOR, \
                                MSEC2T_DENOMINATOR, MSEC2T
```

HRTIMER.C

```
_MAX_IN))

extern U32 far  hrtime(void);
extern void far hrt_open(void);
extern void far hrt_close(void);
extern void far hrt_clear(void);
extern void far wait_frame(void);


/*
**      ratio_conversion -      transform a value from one unit to
 another
**                                                  using a ratio, wit
h as little overflow
**                                                  as possible
**
*/
U32     ratio_conversion(U32 in_value, U32 numerator, U32 denomina
tor,
                        U32 max_input)
        {
        U32     retVal;

        if(in_value>max_input)
                in_value = max_input;

        retVal = ((in_value*numerator) + (denominator>>1)) / denom
inator;

        return(retVal);
        }

U32 requested_diff;


void    init_hrt()
        {
        hrt_open();
        hrt_clear();
        requested_diff = USEC2T(33320L);
        }


void    wait_frame()
        {
    static U32 last_time;
    U32 this_time;
    U32 this_diff;

    do
```

HRTIMER.C

```
                {
RETRY_HRTIME:
                this_time = hrtime();
                this_diff = this_time - last_time;
                if( this_diff > USEC2T_MAX_IN )    /* a tick can be
 missed */
            goto RETRY_HRTIME;
                } while( this_diff < requested_diff );
        hrt_clear();
    last_time = hrtime();
    if( (unsigned int)last_time == 0 )
        last_time = hrtime();
        }
```

IO.C

```
/* io.c */
#include <stdio.h>
#include <stdlib.h>
#include <string.h>
#include <time.h>
#include <conio.h>
#include <ctype.h>
#include <process.h>
#include <sys\timeb.h>
#include <time.h>
#include "..\simpleic.h"
#include "\gfc400\h\commlib.h"
#include "\gfc400\h\multport.h"
#include "ssu.h"


#define ASSIGN          1
#define LOGICAL         2

PORT    *ports[MAX_CREATURES];
PORT    *midi_ports[MAX_MIDI_PORTS];
char    operators[NUM_OPERATORS] = {
        '0', '+', '-', '*', '!', '%', '=', '&', '|', '>', '<', '^'
, '#'
        };
char    *operator_str[NUM_OPERATORS] = {
        "0", "+", "-", "*", "!", "%%", "=", "&", "|", ">", "<", "^
", "#"
        };
FILE    *fps[MAX_FILES];
char    *files[MAX_FILES];
int             cur_file;

static int label_pending;
static char     tok_seps[] = {'\r', '\n', '\t', ' ', ','};
static char current_line[200];
char    pwd[] = "Velcrol.33";


int load_game(game)
char    *game;
        {
        char    filename[80];
        char    game2[80];
        char    txt[80];
        int             i=0;

        while( isspace(*game) )     // skip leading whitespace
                game++;
        while( !isspace(*game) && *game )
                game2[i++] = *game++;     // set EOS before ending
```

IO.C

```
 whitespace
        game2[i] = '\0';
        clear_memory();
        strcpy(filename, game2);
        strcat(filename, ".SCN");
        if( !open_scene_file(filename) )
                {
                sprintf(txt, "Error opening scene file %s", filena
me);
                error_msg(txt);
                return 1;
                }
        strcpy(filename, game2);
        strcat(filename, ".MID");
        if( !open_midi_file(filename) )
                {
                sprintf(txt, "Error opening MIDI file %s", filenam
e);
                error_msg(txt);
                return 1;
                }
        strcpy(filename, game2);
        strcat(filename, ".RUL");
        if( !open_rules_file(filename) )
                {
                sprintf(txt, "Error opening rule file %s", filenam
e);
                error_msg(txt);
                return 1;
                }
        strcpy(cur_game, game2);
        report(LOAD_GAME_CMD, 0, 0);
        show_game();
        return 0;
        }


open_scene_file(filename)
char    *filename;
        {
        cur_file = 0;
        scenes = 0;
        if( (fps[cur_file] = file_open(filename)) == NULL )
                {
                printf("Scene file %s not found", filename);
                return 0;
                }
        while ( 1 )
                {
                if( get_scene_line() == 0 )
                        break;
```

IO.C

```
                scenes++;
                if( scenes > MAX_SCENES )
                        {
                        scenes = MAX_SCENES;
                        error_msg("Maximum number of scenes exceed
ed");
                        break;
                        }
                };
        file_close(cur_file);
        return 1;
        }


open_midi_file(filename)
char    *filename;
        {
        num_midi_cmds = 0;
        cur_file = 0;
        if( (fps[cur_file] = file_open(filename)) == NULL )
                {
                printf("MIDI file %s not found", filename);
                return 0;
                }
        while ( 1 )
                {
                if( get_midi_line() == 0 )
                        break;
                num_midi_cmds++;
                if( num_midi_cmds > MAX_MIDI_CMDS )
                        {
                        num_midi_cmds = MAX_MIDI_CMDS;
                        error_msg("Maximum number of MIDI commands
 exceeded");
                        break;
                        }
                };
        file_close(cur_file);
        return 1;
        }


#define SCENE_FIELDS    6
#define MIX_FIELDS              14

get_scene_line()
        {
        char    str[MAX_STR+1];
        char    seps[] = ",";
        char    *p;
        int             count;
```

IO.C

```
        if( get_line(str) == 0 )
                return 0;
    /* Break into tokens. */
    count = 0;
    strcpy( current_line, str );
    p = strtok( str, seps );      /* Find first token        */
    while( p != NULL )
        {
        count++;
#ifdef DEBUG
        printf( "Scene %d Token %d: %s\n", scenes, count, p );
#endif
                if( count == 1 )
                        {
                        strcpy(scene[scenes].id, p);
                        scene[scenes].id[MAX_ID] = '\0';
                        }
                else if( count == 2 )
                        scene[scenes].priority = atoi(p);
                else if( count == 3 )
                        scene[scenes].duration = atol(p);
                else if( count == 4 )
                        scene[scenes].non_repeat = atol(p);
                else if( count == 5 )
                        scene[scenes].spool_time = atol(p);
                else if( count < 14 )
                        {
                        if( p[0] == '"' )               /* is it a
 text string? */
                                {
                                p++;
/* eat leading quote mark */
                                p[strlen(p)-1] = '\0';  /* eat tra
iling quote mark */
                        scene[scenes].mix[count-SCENE_FIELDS] = -1
;               /* tag it as a text string */
                        if( (scene[scenes].macro = malloc(strlen(p
)+1)) != NULL )
                                strcpy(scene[scenes].macro, p);
                        else
                                ; /* its an error */
                            }
                        else
                        scene[scenes].mix[count-SCENE_FIELDS] = at
oi(p);
                }
        else                    // itsa MIDI command
                {
                scene[scenes].midi[count-MIX_FIELDS] = atoi(p);
                }
```

IO.C

```
        p = strtok( NULL, seps );   /* Find next token          */
        }
// WRONG
//      for(
//       ; count<MAX_CREATURES; count++)
//              scene[scenes].mix[count] = 0;
//      for( ; count<MAX_CREATURES; count++)
//              scene[scenes].mix[count] = 0;
#ifdef DEBUG
        fullkey();
#endif
        return 1;
        }


get_midi_line()
        {
        char    str[MAX_STR+1];
        char    seps[] = ",";
        char    *p;
        int             count;
        int             err = 0;

        if( get_line(str) == 0 )
                return 0;
    /* Break into tokens. */
    count = 0;
    strcpy( current_line, str );
    p = strtok( str, seps );     /* Find first token         */
    while( p != NULL )
        {
        count++;
#ifdef DEBUG
        printf( "MIDI cmd %d Token%d: %s\n", scenes, count, p );
#endif
                if( count == 1 )                        // user-specif
ied command number
                        midi_cmd[num_midi_cmds].num = atoi(p);

                else if( count == 2 )

                        {
                        while( *p == ' ' || *p == '\t' )        //
 skip leading blanks
                                p++;
                        if( strcmp(p, "ON") == 0 )              //
 note on?
                                midi_cmd[num_midi_cmds].cmd = MIDI
_NOTE_ON;       // command type
                        else if( strcmp(p, "OFF") == 0 )
// note off
```

IO.C

```
                                midi_cmd[num_midi_cmds].cmd = MIDI
_NOTE_OFF;      // command type
                        else if( strcmp(p, "PC") == 0 )         //
 program change
                                midi_cmd[num_midi_cmds].cmd = MIDI
_PROGRAM_CHANGE;        // command type
                        else if( strcmp(p, "MC") == 0 )         //
 MIDI Controller
                                midi_cmd[num_midi_cmds].cmd = MIDI
_CONTROLLER;
                        else
                                err = SYNTAX_ERROR;
                        }
                else if( count == 3 )
                        midi_cmd[num_midi_cmds].cmd |= (atoi(p) -
1);   // channel, or into low nibble
                else if( count == 4 )
                        midi_cmd[num_midi_cmds].value = atoi(p);
    // note number / patch / controller
                else if( count == 5 )
                        midi_cmd[num_midi_cmds].velocity = atoi(p)
;   // velocity / controller value (optional)
        p = strtok( NULL, seps );   /* Find next token         */
        }
#ifdef DEBUG
        fullkey();
#endif
        if( err )
                {
                display_midi_error(err);
                }
        return 1;
        }


open_rules_file(filename)
char    *filename;
        {
        char    str[MAX_STR+1];

        cur_file = 0;
        num_rules = 0;
        if( (fps[cur_file] = file_open(filename)) == NULL )
                {
                printf("Rules file %s not found", filename);
                return 0;
                }
        while ( get_line(str) )
                {
                get_rule_line(str);
                };
```

IO.C

```
        file_close(cur_file);
        return 1;
        }

FILE    *file_open(filename)
char    *filename;
        {
        char    xlat_name[80];
        char    cmd_str[80];
        FILE    *fp;
        char    *ptr;

        strcpy(xlat_name, filename);            // create a copy o
f the filename with a .?Z? ext
        ptr = strchr(xlat_name, '.');
        if( ptr == NULL )
                return NULL;
        ptr += 2;
        *ptr = 'Z';
        sprintf(cmd_str, "pkunzip -s%s -c %s > NUL", pwd, xlat_nam
e);
//      printf("%s\n", cmd_str);
//      getche();
        system(cmd_str);
        if( (fp = fopen(filename, "rb")) == NULL )
                {
                unlink(xlat_name);
                return NULL;
                }
        files[cur_file] = malloc(strlen(filename)+1);
        strcpy(files[cur_file], filename);
        return fp;
        }


void    file_close(n)
int     n;
        {
        fclose(fps[n]);
        unlink(files[n]);
        free(files[n]);
        }


int get_line(str)
char    *str;
        {
        char    sstr[MAX_STR+1];
        FILE    *fp;

START_GET_LINE:
```

IO.C

```
        fp = fps[cur_file];
        if( fgets(str, MAX_STR, fp) == NULL )
                {
                if( cur_file )
                        {
                        file_close(cur_file);
                        --cur_file;
                        goto START_GET_LINE;
                        }
                return 0;
                }
        while( str[strlen(str)-3] == CONT_LINE )
                {
                if( fgets(sstr, MAX_STR, fp) == NULL )
                        return 1;
                else
                        {
                        strcpy(&str[strlen(str)-3], sstr);
                        }
                }
        return 1;
        }


void    get_rule_line(str)
char    *str;
        {
        int     err = 0;

        strcpy( current_line, str );
        if( *str == PRE_PROCESS_TAG )
                {
                pre_process_line(str, &err);
                if( err )
                        display_pre_process_error(err);
                }
        else
                {
                rule_line(str, &err);
                if( err )
                        display_rule_error(err);
                }
    }


void pre_process_line(str, err)
char    *str;
int             *err;
        {
        char    seps[] = "    ,";
```

IO.C

```
        char    *p;
        int             count;
        int             error = 0;
        int             cmd;

    count = 0;
    seps[0] = '\t';
    seps[1] = '\r';
    seps[2] = '\n';
    p = strtok( str, seps );     /* Find first token        */
    while( p != NULL && strcmp(COMMENT_STRING, p) && !error )
        {
        count++;
#ifdef DEBUG
        printf( "Pre-process: Token %d: %s\n", count, p );
#endif
                switch( count )
                        {
                        case 1:
                                p++;            /* skip tag */
                                cmd = xlat_pp_cmd(p, &error);
                                break;
                        case 2:
                                switch( cmd )
                                        {
                                        case ALIAS:
                                                if( strlen( p ) >
MAX_ALIAS_LEN )

                                                {
                                                *err = ALIAS_TOO_L
ONG;

                                                return;
                                                }
                                        if( (alias_from[num_al
iases] = malloc(strlen(p)+1)) == NULL )

                                                {
                                                *err = NO_ALIAS_ME
M;

                                                return;
                                                }
                                                strcpy(alias_from[
num_aliases], p);

                                        if( (alias_to[num_alia
ses] = malloc(2)) == NULL )

                                                {
                                                *err = NO_ALIAS_ME
M;

                                                return;
                                                }
                                                strcpy(alias_to[nu
m_aliases], " ");       /* in case no third term appears */
```

IO.C

```
                                                    if( (num_aliases+1
) >= MAX_ALIASES )
                                                            {
                                                            *err = TOO
_MANY_ALIASES;
                                                            return;
                                                            }
                                                    num_aliases++;
 /* at this point we have an alias */
                                                    break;
                                            case LABEL:
                                                    label_pending = at
oi(p);
                                                    if( label_pending
< MIN_LABEL ||
                                                            label_pend
ing > MAX_LABEL)
                                                            {
                                                            *err = LAB
EL_ERR;
                                                            label_pend
ing = 0;
                                                            return;
                                                            }
                                                    break;
                                            case INCLUDE:
                                                    if( (fps[++cur_fil
e] = file_open(p)) == NULL )
                                                            {
                                                            cur_file--
;
                                                            *err = INC
LUDE_ERR;
                                                            }
                                                    break;
                                            default:
                                                    *err = UNDEF_DEF;
                                            }
                                    break;
                            case 3:
                                    switch( cmd )
                                            {
                                            case ALIAS:
                                                    if( strlen( p ) >
MAX_ALIAS_LEN )
                                                            {
                                                            *err = ALIAS_TOO_L
ONG;
                                                            return;
                                                            }
                                                if( (alias_to[num_alia
```

IO.C

```
ses-1] = realloc(alias_to[num_aliases-1], strlen(p)+1)) == NULL )
                                                          {
                                                          *err = NO_ALIAS_ME
M;
                                                          return;
                                                          }
                                                          strcpy(alias_to[nu
m_aliases-1], p);
                                                          break;

                                                   case LABEL:
       /* there is no second field */
                                                          break;
                                                   case INCLUDE:
                                                          break;
                                                   default:
                                                          *err = UNDEF_DEF;
                                                          break;
                                                   }
                                            break;
                                     }
       p = strtok( NULL, seps );   /* Find next token */
       }
#ifdef DEBUG
       fullkey();
#endif
       }


int    xlat_pp_cmd(str, err)
char   *str;
int           *err;
       {
       if( strcmp(str, ALIAS_STR) == 0 )
              return ALIAS;
       if( strcmp(str, LABEL_STR) == 0 )
              return LABEL;
       if( strcmp(str, INCLUDE_STR) == 0 )
              return INCLUDE;
       *err = UNDEF_DEF;
       return 0;
       }


void   rule_line(str, error)
char   *str;
int           *error;
       {
       struct rule_def rul;
       char   *p;
       int           count = 0;
```

IO.C

```
        int     ind, starting_index, ending_index;

    rul.dependent = 0;          /* default parameters */
    rul.label = 0;
    rul.operation = SET;
    rul.value = 1;
    rul.var1 = 0;
    rul.condition = 0;
    rul.var2 = 0;
    rul.else_dependent = 0;             /* no default else clause
*/
    rul.else_operation = SET;   /* naming only dependent will set
it TRUE */
    rul.else_value = 1;

    p = strtok( str, tok_seps );     /* Find first token        */
    while( p != NULL && strcmp(COMMENT_STRING, p) && !*error )
        {
        count++;
#ifdef DEBUG
        printf( "Rule %d Token %d: %s\n", num_rules, count, p );
#endif
                switch( count )
                        {
                        case 1:
                                rul.dependent = xlat_symbol(p, err
or);
                                break;
                        case 2:
                                rul.operation = xlat_operator(p, e
rror, ASSIGN);
                                break;
                        case 3:
                                rul.value = xlat_symbol(p, error);
                                break;
                        case 4:
                                if( strcmp( "(", p) != 0 )
                                        *error = LEFT_PAREN_ERR;
                                break;
                        case 5:
                                rul.var1 = get_var(p, error);
                                break;
                        case 6:
                                rul.condition = xlat_operator(p, e
rror, LOGICAL);
                                break;
                        case 7:
                                rul.var2 = get_var(p, error);
                                break;
                        case 8:
                                if( strcmp( ")", p) != 0 )
```

IO.C

```
                                *error = RIGHT_PAREN_ERR;
                        break;
                case 9:
                        if( stricmp( ELSE_TOKEN, p ) != 0
)
                                *error = ELSE_ERROR;
                        break;
                case 10:
                        rul.else_dependent = xlat_symbol(p
, error);
                        break;
                case 11:
                        rul.else_operation = xlat_operator
(p, error, ASSIGN);
                        break;
                case 12:
                        rul.else_value = xlat_symbol(p, er
ror);
                        break;
                }
        p = strtok( NULL, tok_seps );   /* Find next token */
        }
#ifdef DEBUG
        fullkey();
#endif
        if( count >= 3 && !(*error) )
                {
                if( rul.operation == ALL_SET )    // run this rule
 only when loading file
                        {
                        starting_index = get_index(rul.dependent);
                        ending_index = get_array_size(rul.dependen
t);
                        for(ind=0; ind<(ending_index-starting_inde
x); ind++)
                                set_value(rul.dependent+ind, rul.v
alue);
            }
                else
                        make_rule(&rul);
                }
    }


void display_rule_error(err)
int             err;
        {
        char    msg[80];

    display_line(current_line);
        sprintf(msg, "Rule error: %s (press a key)", syntax_error_
```

IO.C

```
msg(err));
        error_msg(msg);
        fullkey();
        }


void display_midi_error(err)
int             err;
        {
        char    msg[80];

    display_line(current_line);
        sprintf(msg, "MIDI error: %s (press a key)", syntax_error_
msg(err));
        error_msg(msg);
        fullkey();
        }



void display_pre_process_error(err)
int             err;
        {
        char    msg[80];

    display_line(current_line);
        sprintf(msg, "Pre-process error: %s (press a key)", syntax
_error_msg(err));
        error_msg(msg);
        fullkey();
        }


void make_rule(rul)
struct rule_def *rul;
        {
        rule[num_rules] = *rul;
        if( label_pending )
                {
                add_label(label_pending, num_rules);
                label_pending = 0;
                }
        num_rules++;
        if( num_rules > MAX_RULES )
                {
                num_rules = MAX_RULES;
                error_msg("Maximum number of rules exceeded");
                }
        }
```

IO.C

```
int             get_var(p, error)
char    *p;
int             *error;
        {
        int             v;
        struct rule_def rul;

        if( strcmp(p, "(") == 0 )           /* dropping down anothe
r level */
                {
                rul.dependent = VARIABLE_BASE + TEMP_OFFSET + last
_temp_var++;
                rul.operation = SET;
                rul.value = 1;
                rul.label = 0;
        p = strtok( NULL, tok_seps );   /* Find next token */
                rul.var1 = get_var(p, error);
        p = strtok( NULL, tok_seps );   /* Find next token */
                rul.condition = xlat_operator(p, error, LOGICAL);
        p = strtok( NULL, tok_seps );   /* Find next token */
                rul.var2 = get_var(p, error);
        p = strtok( NULL, tok_seps );   /* Find next token */
                if( strcmp(p, ")") != 0 )       /* eat token, must
 be right paren */
                        *error = RIGHT_PAREN_ERR;
                make_rule(&rul);
                return rul.dependent;
                }
        else
                {
                v = xlat_symbol(p, error);              /* transla
te tok to var v */
                return v;
                }
        }


int             all_blank(txt)
char    *txt;
        {
        char    ch;

        if( !strlen(txt) )                      /* empty strings a
re all blank */
                return YES;
        while( ch = *txt++ )
                {
                if( ch != ' ' )                 /* any non-blank a
nywhere OK */
                        return NO;
                }
```

IO.C

```
        return YES;
        }

struct rule_def a_rule;

struct rule_def *xlat_rule(str, err)
char    *str;
int             *err;
        {
        char    seps[] = "  ,";
        char    *p;
        int             count;
        int             error = 0;

    count = 0;
    seps[0] = '\t';
    a_rule.dependent = 0;                   /* default parameters */
    a_rule.label = 0;
    a_rule.operation = SET;
    a_rule.value = 1;
    a_rule.var1 = 0;
    a_rule.condition = 0;
    a_rule.var2 = 0;
    a_rule.else_dependent = 0;                      /* no default else
 dependent */
    a_rule.else_operation = SET;                    /* if not specifed
, else dependent wiil */
    a_rule.else_value = 1;                                  /* be set
to 1 (TRUE) */

    p = strtok( str, seps );      /* Find first token        */
    while( p != NULL && strcmp(COMMENT_STRING, p) && !error )
        {
        count++;
#ifdef DEBUG
        printf( "Rule %d Token %d: %s\n", num_rules, count, p );
#endif
                switch( count )
                        {
                        case 1:
                                a_rule.dependent = xlat_symbol(p,
&error);
                                break;
                        case 2:
                                a_rule.operation = xlat_operator(p
, &error, ASSIGN);
                                break;
                        case 3:
                                a_rule.value = xlat_symbol(p, &err
or);
```

IO.C

```
                                break;
                        case 4:
                                a_rule.var1 = xlat_symbol(p, &erro
r);
                                break;
                        case 5:
                                a_rule.condition = xlat_operator(p
, &error, LOGICAL);
                                break;
                        case 6:
                                a_rule.var2 = xlat_symbol(p, &erro
r);
                                break;
                        case 7:                         /* must be
 ELSE if present */
                                if( stricmp( ELSE_TOKEN, p) != 0 )
                                        error = ELSE_ERROR;
                                break;
                        case 8:
                                a_rule.else_dependent = xlat_symbo
l(p, &error);
                                break;
                        case 9:
                                a_rule.else_operation = xlat_opera
tor(p, &error, ASSIGN);
                                break;
                        case 10:
                                a_rule.else_value = xlat_symbol(p,
 &error);
                                break;
                        }
        p = strtok( NULL, seps );   /* Find next token */
        }
#ifdef DEBUG
        fullkey();
#endif
        if( a_rule.dependent == 0 )
                error = INCOMPLETE_ERR;
        if( error )
                {
                *err = error;
                return NULL;
                }
        else
                return &a_rule;
        }


char    *xlat_alias(str)
char    *str;
        {
```

IO.C

```
        int     i;

        for(i=0; i<num_aliases; i++)
                {
                if( strcmp(str, alias_from[i]) == 0 )
                        return alias_to[i];
                }
        return NULL;
        }


char    *get_alias(str)
char    *str;
        {
        int     i;

        for(i=0; i<num_aliases; i++)
                {
                if( strcmp(str, alias_to[i]) == 0 )
                        return alias_from[i];
                }
        return NULL;
        }


int             xlat_symbol(p, err)       /* translate RUL file sy
mbols */
char    *p;
int             *err;
        {
        if( p[0] == ALIAS_TAG )       /* translate aliases if foun
d before further processing */
                {
                p = xlat_alias(p);
                if( p == NULL )
                        {
                        *err = ALIAS_ERR;
                        return 0;
                        }
                }
        switch( p[0] )          /* look at first char in string */
                {
                case 'e':
                case 'E':
                        if( atoi(&p[1]) > MAX_EVENTS )
                                *err = EVENT_ERR;
                        return EVENT_BASE + atoi(&p[1]);
                        break;
                case 'v':
                case 'V':
```

IO.C

```
                if( atoi(&p[1]) > (MAX_VARS+MAX_TEMP_VARS)
)
                        *err = VAR_ERR;
                return VARIABLE_BASE + atoi(&p[1]);
                break;
        case 't':
        case 'T':
                if( atoi(&p[1]) > MAX_TIMERS )
                        *err = TIMER_ERR;
                return TIMER_BASE + atoi(&p[1]);
                break;
        case 's':
        case 'S':
                if( atoi(&p[1]) > MAX_SCENES )
                        *err = SCENE_ERR;
                return SCENE_BASE + atoi(&p[1]);
                break;
        case 'p':
        case 'P':
                if( atoi(&p[1]) >= MAX_OUTPUTS )
                        *err = PRIORITY_ERR;
                return PRIORITY_BASE + atoi(&p[1]);
                break;
        case 'd':
        case 'D':
                if( atoi(&p[1]) >= MAX_OUTPUTS )
                        *err = DURATION_ERR;
                return DURATION_BASE + atoi(&p[1]);
                break;
        case 'g':
        case 'G':
                return LABEL_BASE;
                break;
        case 'w':
        case 'W':
                if( atoi(&p[1]) >= MAX_REAL_TIMES )
                        *err = REAL_TIME_ERR;
                return REAL_TIME_BASE + atoi(&p[1]);
                break;
        case 'c':
        case 'C':
                return CLOCK_VAR;
                break;
        case 'y':
        case 'Y':
                return DAY_VAR;
                break;
        default:                                /* assume it must
be an integer */
                return atoi(&p[0]);
                break;
```

IO.C

```
                }
        }

int             xlat_operator(p, err, type)
char    *p;
int             *err;
int             type;
        {
        unsigned int    ind;

        ind =  strcspn(operators, p);      /* what if not found */
        if( ind >= NUM_OPERATORS )
                {
                *err = ILLEGAL_OPERATOR;
                return 0;
                }
        else
                {
                switch (type)
                        {
                        case ASSIGN:
                                if( ind > OPERATOR_BOUNDARY )
                                        {
                                        *err = ILLEGAL_ASSIGN;
                                        return 0;
                                        }
                                else
                                        return ind;
                                break;
                        case LOGICAL:
                                if( ind <= OPERATOR_BOUNDARY )
                                        {
                                        *err = ILLEGAL_LOGICAL;
                                        return 0;
                                        }
                                else
                                        return ind;
                                break;
                        default:
                                *err = ILLEGAL_OPERATOR;
                                return 0;
                                break;
                        }
                }
        return 0;                                    /* can't get here
*/
        }

unsigned char exts[MAX_EXT];                         /* array for value
```

IO.C

```
s of this frame's events */
unsigned char old_exts[MAX_EXT];        /* array for previous fram
e's values of events */

void    check_ext_interrupt(void)
        {
        int     i, j, oj, port;
        unsigned int    mask;
        unsigned char e[MAX_EXT/8];    /* array for bytes of raw e
xternal inputs */

        if( demo )
                return;
        /*if a de-bounced external interrupt is received, set ch t
o A + int# */
        /* and return non-zero */
        for(j=0, port=IO_BASE; j<(num_ext/8); j++, port++)
/* read all external inputs */
                {
                if( (port & 0x03) == 0x03 )             /* skip 4t
h port(s) */
                        port++;
                e[j] = inp(port);               /* read a byte (8
events) */
                e[j] ^= 0xFF;                   /* create positive
 logic */
                }
        for(i=0, oj=0, mask=1; i<num_ext; i++)
                {
                j = i / 8;              /* translate event number
to byte number */
                if( j != oj )
                        {
                        mask = 1;                       /* reset s
hift mask for each new byte */
                        oj = j;
                        }
                if( e[j] & mask )
                        exts[i] = 1;
                else
                        exts[i] = 0;
                mask <<= 1;
                }
        for(i=0; i<num_ext; i++)          /* find leading edge o
f each event */
                {
                if( exts[i] && !old_exts[i] )
                        {
                        event[i] = 1;     /* and latch event[] */
                        }
                }
```

IO.C

```
        memcpy(old_exts, exts, num_ext);
        }


void    send_str(mx, bfr)
int             mx;
char    *bfr;
        {
        if( !demo )
                WriteBufferTimed(ports[mx], bfr, strlen(bfr), 500L
);
        }


void send_midi(mp, cmd)
int     mp;
int     cmd;
        {
        unsigned char b[10];
        int             ind;

        if( (ind = get_midi_cmd_index(cmd)) < 0 )
                return;

        b[0] = midi_cmd[ind].cmd;               // command and cha
nnel
        b[1] = midi_cmd[ind].value;
        if( (midi_cmd[ind].value & 0xF0 ) != MIDI_PROGRAM_CHANGE )
                {
                b[2] = midi_cmd[ind].velocity;
                b[3] = '\0';
                }
        else
                b[2] = '\0';
        if( !demo )
                WriteBufferTimed(midi_ports[mp], b, strlen(b), 500
L);
        }


int             get_midi_cmd_index(cmd)
int             cmd;
        {
        int     ind = -99;
        int     mc;

        for(mc=0; mc<num_midi_cmds; mc++)
                {
                if( midi_cmd[mc].num == cmd )
                        {
                        ind = mc;
```

IO.C

```
                        break;
                        }
                }
        return ind;
        }


int     open_com_ports()
        {

        int     irq;
        int     first_port_number;
        int     first_port_address;
        int     stat;
        int     prt;

        if( demo )
                return 0;
        printf("Opening COM ports...\n");

        irq = IRQ5;
        first_port_number = START_PORT;
        first_port_address = 0x300;
        if( (stat = InstallStandardQuaTech(irq, first_port_number,
 first_port_address)) !=
                        ASSUCCESS )
                {
                printf("com board open failed, stat = %d", stat);
                return 1;
                }
        for(prt = 0; prt<MAX_CREATURES; prt++)
                {
                ports[prt] = PortOpenGreenleaf(prt+START_PORT, BAU
D_RATE, PARITY, WORD_LENGTH, STOP_BITS);
                if( ports[prt]->status < ASSUCCESS )
                        {
                        printf("Port %d open failed, status = %d\n
", prt+1, ports[prt]->status);
                        return 2;
                        }
                }
        return 0;
        }


void close_com_ports()
        {
        int     irq;
        int     prt;
```

IO.C

```
        if( demo )
                return;
        irq = IRQ5;
        for(prt = 0; prt<MAX_CREATURES; prt++)
                PortClose( ports[prt] );
        RemoveStandardQuaTech( irq );
        }


int     open_midi_ports()
        {

        int     irq;
        int     first_port_number;
        int     first_port_address;
        int     stat;
        int     prt;

        if( demo )
                return 0;
        printf("Opening MIDI ports...\n");

        irq = MIDI_IRQ;
        first_port_number = MIDI_BASE_COM;
        first_port_address = MIDI_BASE_PORT;
        if( (stat = InstallStandardQuaTech(irq, first_port_number,
 first_port_address)) !=
                        ASSUCCESS )
                {
                printf("MIDI board open failed, stat = %d", stat);
                return 1;
                }
        for(prt = 0; prt<MAX_MIDI_PORTS; prt++)
                {
                midi_ports[prt] = PortOpenGreenleaf(prt+MIDI_BASE_
COM, MIDI_BAUD_RATE,

                PARITY, WORD_LENGTH, STOP_BITS);
                if( midi_ports[prt]->status < ASSUCCESS )
                        {
                        printf("MIDI Port %d open failed, status =
 %d\n", prt+1,
                                        midi_ports[prt]->status);
                        return 2;
                        }
                }
        return 0;
        }

void close_midi_ports()
```

IO.C

```
        {
        int     irq;
        int     prt;

        if( demo )
                return;
        irq = MIDI_IRQ;
        for(prt = 0; prt<MAX_MIDI_PORTS; prt++)
                PortClose( midi_ports[prt] );
        RemoveStandardQuaTech( irq );
        }


void debounce_delay()
        {
        long    begin_tick, end_tick;
        /* wait 2 timer ticks */
   _bios_timeofday( _TIME_GETCLOCK, &begin_tick );
   begin_tick += 2;
   while( 1 )
                {
             _bios_timeofday( _TIME_GETCLOCK, &end_tick );
                if( end_tick >= begin_tick )
                        break;
                }
        }


void read_keyboard()
        {
        int             ch;

        if(     _kbhit() )
                {
                ch = _getch();
                /*ch = toupper(ch);             case insensitive
*/
                switch( ch )
                        {
                        case ESC:
                                str_pos = 0;
                                cmd_str[str_pos] = '\0';
                                display_cmd_string();
                                break;
                        case BACKSPACE:
                                str_pos--;
                                cmd_str[str_pos] = '\0';
                                display_cmd_string();
                                break;
                        case ENTER:
                                run_str();
```

IO.C

```
                        display_cmd_string();
                        break;
                case TAB:
                        strcpy(cmd_str, old_cmd_str);
                        str_pos = old_str_pos;
                        run_str();
                        display_cmd_string();
                        break;
                default:
                        if( str_pos < (MAX_STR_LEN-1) )
                                {
                                cmd_str[str_pos++] = (char
)ch;
                                cmd_str[str_pos] = '\0';
                                }
                        display_cmd_string();
                        break;
                }
        }
    }


int time_in_minutes()
    {
    struct tm *newtime;
    time_t long_time;
    int         mins;

    time( &long_time );                     /* Get time as long in
teger. */
    newtime = localtime( &long_time );      /* Convert to local ti
me. */

    mins = (newtime->tm_hour * 60) + newtime->tm_min;
    return mins;                            /* return number of mi
nutes since midnight */
    }


int day_of_week()
    {
    struct tm *newtime;
    time_t long_time;

    time( &long_time );                     /* Get time as long in
teger. */
    newtime = localtime( &long_time );      /* Convert to local ti
me. */

    return newtime->tm_wday;                 /* return DOW since S
unday */
```

IO.C

```
}
```

SCREEN.C

```
/* screen.c */
#include <stdio.h>
#include <stdlib.h>
#include <string.h>
#include <time.h>
#include <conio.h>
#include "..\simpleio.h"
#include "ssu.h"

#include "acme_ver.h"

extern char operators[NUM_OPERATORS];
extern char     *operator_str[NUM_OPERATORS];



void error_msg(txt)
char    *txt;
        {
        dos_cursor(LEFT_MARG, REPORT_LINE);
        printf("%s", txt);
        }


void display_line(str)
char    *str;
        {
        dos_cursor(LEFT_MARG, PRIORITY_LINE);
        printf("LINE: %s", str);
        }


char    *syntax_error_msg(num)
int             num;
        {
        return error_desc[num];
        }

void    show_screen()
        {
        int     line=0;
        char    title[80];

        clear_screen();
        sprintf(title, "ACME System Supervisor v%s", SSU_VER);
        show_title(title);
        show_game();
        line = 2;
        line++;
        line++;
```

SCREEN.C

```
        dos_cursor((UCHR)LEFT_MARG, (UCHR)line++);
        printf("!S -- Stop All Systems");
        dos_cursor((UCHR)LEFT_MARG, (UCHR)line++);
        printf("!L -- Load New Game");
        dos_cursor((UCHR)LEFT_MARG, (UCHR)(line++));
        printf("!P -- Start All Systems");
        line++;
        dos_cursor((UCHR)LEFT_MARG, (UCHR)(line++));
        printf("!Y -- Cycle All Systems");
        line++;
        dos_cursor((UCHR)LEFT_MARG, (UCHR)(line++));
        printf("!X -- Exit Program");
        display_cmd_string();
        }


void show_game()
        {
        dos_cursor((UCHR)LEFT_MARG, 2);
        printf("Running game \"%s\"        ", cur_game);
        }


void display_cmd_string()
        {
        dos_cursor(LEFT_MARG, CMD_STR_LINE);
        printf("Command: %-60s", cmd_str);
        }


void show_priorities()
        {
        dos_cursor(LEFT_MARG, PRIORITY_LINE);
        printf("MIX Priorities:  %4d %4d %4d %4d %4d %4d %4d %4d",
                mix[0].priority,
                mix[1].priority,
                mix[2].priority,
                mix[3].priority,
                mix[4].priority,
                mix[5].priority,
                mix[6].priority,
                mix[7].priority);
        dos_cursor(LEFT_MARG, PRIORITY_LINE+1);
        printf("MIDI Priorities: %4d %4d %4d %4d %4d %4d %4d %4d",
                mix[8].priority,
                mix[9].priority,
                mix[10].priority,
                mix[11].priority,
                mix[12].priority,
                mix[13].priority,
                mix[14].priority,
```

SCREEN.C

```
		mix[15].priority);
	dos_cursor((UCHR)(LEFT_MARG + PROMPT_LEN + str_pos), CMD_S
TR_LINE);
	}


void show_real_time()
	{
	int	i;
	char	sub_msg[20];

	for(i=0; i<MAX_REAL_TIMES; i++)		// show all watch item
s
		{
		if( real_time[i] )
			{
			dos_cursor(0, (UCHR)(CMD_STR_LINE - (10-i)
) );
			expand_symbol(real_time[i], sub_msg);
			printf("%20s %5d   ",
				sub_msg, get_value(real_time[i]));
			}
		else
			{
			dos_cursor(0, (UCHR)(CMD_STR_LINE - (10-i)
) );
			printf("                              ");
			}
		}
	dos_cursor((UCHR)(LEFT_MARG + PROMPT_LEN + str_pos), CMD_S
TR_LINE);
	}


void show_data(str)
char	*str;
	{
	char	msg[100];
	char	dep[MAX_ALIAS_LEN+1];
	char	val[MAX_ALIAS_LEN+1];
	char	v1[MAX_ALIAS_LEN+1];
	char	v2[MAX_ALIAS_LEN+1];
	char	*ptr;
	int		i;

	/* skip leading blanks */
	while( *str == ' ' )
		str++;
	switch( toupper(*str) )		/* look at first non-blank
 */
		{
```

SCREEN.C

```
                case '_':
                        if( (ptr = xlat_alias(str)) == NULL )
                                sprintf(msg, "Alias is not defined
");
                        else
                                sprintf(msg, "Alias for %s is %s",
 str, ptr);
                        display_string(msg);
                        break;
                case 'A':
                        str++;
                        i = atoi(str);
                        if( i < 1 || i > num_aliases )
                                sprintf(msg, "Alias %d is not defi
ned", i);
                        else
                                sprintf(msg, "Alias %d for %s is %
s",
                                        i,
                                        alias_from[i-1],
                                        alias_to[i-1]);
                        display_string(msg);
                        break;
                case 'R':               /* rule*/
                        str++;
                        i = atoi(str);
                        if( i > num_rules )
                                sprintf(msg, "Rule %d is not defin
ed.", i);
                        else
                                {
                                expand_symbol(rule[i-1].dependent,
 dep);
                                expand_symbol(rule[i-1].value, val
);
                                sprintf(msg, "Rule %d, %s %s %s",
                                        i,
                                        dep,
                                        operator_str[rule[i-1].ope
ration],
                                        val);
                                if( rule[i-1].condition )
/* show CONDTION clause if it exists */
                                        {
                                        expand_symbol(rule[i-1].va
r1, v1);
                                        expand_symbol(rule[i-1].va
r2, v2);
                                        sprintf( &msg[strlen(msg)]
, " ( %s %s %s )",
                                                v1,
```

SCREEN.C

```
                                                        operator_str[rule[
i-1].condition],
                                                        v2);
                                                }
                                        if( rule[i-1].else_dependent )    /
* show ELSE clause if it exists */
                                                {
                                                expand_symbol(rule[i-1].el
se_dependent, dep);
                                                expand_symbol(rule[i-1].el
se_value, val);
                                                sprintf( &msg[strlen(msg)]
, " ELSE %s %s %s",
                                                        dep,
                                                        operator_str[rule[
i-1].else_operation],
                                                        val );
                                                }

                                        }
                                display_string(msg);
                                break;
                        case 'S':                       /* scene */

                                str++;
                                i = atoi(str);
                                if( i > scenes )
                                        sprintf(msg, "Scene %d is not defi
ned.", i);
                                else
                                        sprintf(msg, "Scene %d = %d", i, g
et_value(i+SCENE_BASE));
                                display_string(msg);
                                break;
                        case 'E':                       /* event */
                                str++;
                                i = atoi(str);
                                if( i > num_events)
                                        sprintf(msg, "Event %d is not defi
ned.", i);
                                else
                                        sprintf(msg, "Event %d = %d", i, g
et_value(i+EVENT_BASE));
                                display_string(msg);
                                break;
                        case 'T':                       /* timer */
                                str++;
                                i = atoi(str);
                                sprintf(msg, "Timer %d = %d", i, get_value
(i+TIMER_BASE));
                                display_string(msg);
```

SCREEN.C

```
                        break;
                case 'V':       /* variable */
                        str++;
                        i = atoi(str);
                        sprintf(msg, "Variable %d = %d", i, get_va
lue(i+VARIABLE_BASE));
                        display_string(msg);
                        break;
                case 'P':       /* priority */
                        str++;
                        i = atoi(str);
                        sprintf(msg, "Priority %d = %d", i, get_va
lue(i+PRIORITY_BASE));
                        display_string(msg);
                        break;
                case 'D':       /* duration*/
                        str++;
                        i = atoi(str);
                        sprintf(msg, "Duration %d = %d", i, get_va
lue(i+DURATION_BASE));
                        display_string(msg);
                        break;
                case 'L':                               /* remaini
ng spool time for a scene */
                        str++;
                        i = atoi(str);
                        sprintf(msg, "Remaining spool time %d = %d
", i, scene[i].current_spool_time);
                        display_string(msg);
                        break;
                case 'N':                       /* remaining non-repeat ti
me for a scene */
                        str++;
                        i = atoi(str);
                        sprintf(msg, "Remaining non-repeat %d = %d
", i, scene[i].current_non_repeat);
                        display_string(msg);
                        break;
                case 'W':       /* watches */
                        str++;
                        i = atoi(str);
                        expand_symbol(real_time[i], dep);
                        sprintf(msg, "Watch %d = %s", i, dep);
                        display_string(msg);
                        break;
                case 'C':
                        sprintf(msg, "Minutes = %d", time_in_minut
es());
                        display_string(msg);
                        break;
                case 'Y':
```

SCREEN.C

```
                        sprintf(msg, "Day = %d", day_of_week());
                        display_string(msg);
                        break;
                default:                /* unknown */
                        display_string("Data does not compute");
                        break;
                }
        }

char    *expand_symbol(symbol, disp_symb)
int             symbol;
char    *disp_symb;
        {
        char    *ptr;

        if( symbol < EVENT_BASE )
                sprintf(disp_symb, "%d", symbol);
        else if ( symbol < VARIABLE_BASE )
                sprintf(disp_symb, "E%d", symbol - EVENT_BASE);
        else if( symbol < TIMER_BASE )
                sprintf(disp_symb, "V%d", symbol - VARIABLE_BASE);
        else if( symbol < SCENE_BASE )
                sprintf(disp_symb, "T%d", symbol - TIMER_BASE);
        else if( symbol < PRIORITY_BASE )
                sprintf(disp_symb, "S%d", symbol - SCENE_BASE);
        else if( symbol < DURATION_BASE )
                sprintf(disp_symb, "P%d", symbol - PRIORITY_BASE);
        else if( symbol < NON_REPEAT_BASE )
                sprintf(disp_symb, "D%d", symbol - DURATION_BASE);

        else if( symbol < LABEL_BASE )
                sprintf(disp_symb, "N%d", symbol - NON_REPEAT_BASE
);
        else if( symbol < REAL_TIME_BASE )
                sprintf(disp_symb, "G");
        else if( symbol < MAX_BASE )
                sprintf(disp_symb, "W%d", symbol - REAL_TIME_BASE)
;
        else
                sprintf(disp_symb, "Unknown symbol");
        if( (ptr = get_alias(disp_symb)) != NULL )
                strcpy(disp_symb, ptr);
        return disp_symb;
        }

void display_string(str)
char    *str;
        {
        dos_cursor(LEFT_MARG, QUERY_LINE);
```

SCREEN.C

```
        printf("
                   ");
        dos_cursor(LEFT_MARG, QUERY_LINE);
        printf(str);
        }

void report(num, ext, spl)
int             num;
int             ext;
int             spl;
        {
   char dbuffer [9];
   char tbuffer [9];

   _strdate( dbuffer );
   _strtime( tbuffer );
        dos_cursor(LEFT_MARG, REPORT_LINE);
        printf("
                   ");
        dos_cursor(LEFT_MARG, REPORT_LINE);
        switch( num )
                {
                case ALL_STOP:
                        printf("All systems stopped, %s on %s (%s)
", tbuffer, dbuffer,
                                "internal");
                        break;
                case ALL_GO:
                        printf("All systems started, %s on %s (%s)
", tbuffer, dbuffer,
                                "internal");
                        break;
                case ALL_CYCLE:
                        printf("All systems cycled,  %s on %s (%s)
", tbuffer, dbuffer,
                                "internal");
                        break;
                case LOAD_GAME_CMD:
                        printf("Game %s loaded, on %s (%s)", cur_g
ame, tbuffer, dbuffer );
                        break;
                default:
                        if( spl == 1 )
                                printf("Scene %d UNSPOOLED: %s at
%s on %s", num, scene[num].id,
                                        tbuffer, dbuffer );
                        else if( spl == 2 )
                                printf("Scene %d SPOOLED: %s at %s
 on %s", num, scene[num].id,
                                        tbuffer, dbuffer );
```

SCREEN.C

```
                        else
                                printf("Scene %d RUN: %s at %s on
%s", num, scene[num].id,
                                        tbuffer, dbuffer );
                        break;
                }
        }
```

SIMPLEIO.C

```
/* simpleio.c */
#include <stdio.h>
#include <stdlib.h>
#include <string.h>
#include <dos.h>

#include "simpleio.h"


void clear_screen()
    {
    scroll(0);
    dos_cursor(0,0);
    }


UCHR attrbyte = 0x1E;

void show_title(txt)
char *txt;
    {
    UCHR blanks;
    char spaces[] = "
  ";

    blanks = (UCHR)(40 - strlen(txt) / 2);
    printf("\n%*.*s%s\n\n", blanks, blanks, spaces, txt);
    }


void dos_cursor(x,y)
UCHR    x,y;
        {
        union REGS inregs, outregs;

        inregs.h.ah=2;
        inregs.h.bh=0;
        inregs.h.dh=y;
        inregs.h.dl=x;
        int86(0x10, &inregs, &outregs);
        }


void scroll(lines)              /* scroll active display page, 0 m
eans blank page */
UCHR    lines;
        {
        union REGS inregs, outregs;

        inregs.h.ah = 6;                /* scroll function */
        inregs.h.al = lines;
```

SIMPLEIO.C

```
        inregs.h.ch = 0;                /* upper left corner */
        inregs.h.cl = 0;
        inregs.h.dh = (UCHR)24;         /* lower right corner */
        inregs.h.dl = (UCHR)79;
        inregs.h.bh = attrbyte;         /* attribute for blanked l
ines */
        int86(0x10, &inregs, &outregs);
        }

struct vid
                {
                char    Subsystem;
                char    Display;
                } _near VIDstruct[2];

#pragma warning(disable:4762)

void check_video()
        {
        VideoID( VIDstruct );
    /*
        Subsystem = VIDstruct[0].Subsystem;
        Display = VIDstruct[0].Display; */
        if( VIDstruct[0].Display == 1 || VIDstruct[0].Display == 4
 )
                attrbyte = NORM_B_W;
        else
                attrbyte = NORM_COLOR;
        }

#pragma warning(default:4762)


void beep()
    {
    putchar(7);
    }


char *get_str(txt)
char    *txt;
    {
        return gets(txt);
    }


#define KEYINT 8

fullkey()       /* get key, no echo, ext. codes supported */
        {
```

SIMPLEIO.C

```
char    ch;

ch=(char)bdos(KEYINT,0,0);
if(ch==0)
        ch = (char)(-bdos(KEYINT,0,0));
return(ch);
}
```

SSU.C

```
/* ssu.c */
#include <stdio.h>
#include <stdlib.h>
#include <string.h>
#include <time.h>
#include <conio.h>
#include "..\simpleio.h"
#include "\gfc400\h\commlib.h"
#include "\gfc400\h\multport.h"
#define ONCE
#include "ssu.h"

char    exit_pwd[] = "Velcro";


main(argc, argv)
int     argc;
char    **argv;
        {
        check_env();

        clear_screen();
        if( argc > 1 )
                load_game(argv[1]);
        else
                load_game("fangle");                    // default
 initial game file
        if( open_com_ports() )
                return 2;
        if( open_midi_ports() )
                return 3;
        init_system();
        show_screen();
        main_loop();
        clear_screen();
        return 0;
        }


void    check_env()
        {
        if( getenv("DEMO") != NULL )
                demo = 1;
        if( getenv("OMEGA") != NULL )
                {
                num_ext = atoi(getenv("OMEGA"));
                if( num_ext > MAX_EXT )         /* limit value */
                        num_ext = MAX_EXT;
                }
        else
                num_ext = 0;
```

SSU.C

```
        }

void exit_program(str)
char    *str;
        {
        if( strcmp(str, exit_pwd) != 0 )
                return;
        clear_memory();
        hrt_close();
        close_com_ports();
        close_midi_ports();
        clear_screen();
        exit(0);
        }

void    init_system()
        {
        init_hrt();
        clear_vars();
        clear_system();
        clear_memory();
        num_events = 96;
        }

void    clear_memory()
        {
        int     i;

        memset(event, 0, MAX_EVENTS*sizeof(int));
        memset(exe_scene, 0, MAX_SCENES*sizeof(int));
        memset(prev_event, 0, MAX_EVENTS*sizeof(int));
        memset(prev_timer, 0, MAX_TIMERS*sizeof(int));
        memset(prev_variable, 0, (MAX_VARS+MAX_TEMP_VARS)*sizeof(i
nt));
        memset(prev_run_scene, 0, MAX_SCENES*sizeof(int));
        memset(real_time, 0, MAX_REAL_TIMES*sizeof(int));
        for(i=0; i<num_aliases; i++)
                {
                if( alias_from[i] )
                        free(alias_from[i]);
                if( alias_to[i] )
                        free(alias_to[i]);
                }
        num_aliases = 0;
        num_labels = 0;
        last_temp_var = 0;
        goto_rule = 0;
        str_pos = old_str_pos = 0;
```

SSU.C

```
        cmd_str[0] = '\0';
        old_cmd_str[0] = '\0';
        }


void clear_vars()
        {
        memset(Timer, 0, MAX_TIMERS*sizeof(int));
        memset(Variable, 0, (MAX_VARS-MAX_TEMP_VARS)*sizeof(int));
        }


void    main_loop()        /* this is the real-time loop */
        {
        while( 1 )
                {
                wait_frame();    /* run loop 30 times a second */
                read_states();
                decrement_counters();
                read_keyboard();
                test_rules();
                run_scenes();
                copy_vars();
                show_priorities();
                show_real_time();
                }
        }


void run_str()
        {
        int             err;

        switch( cmd_str[0] )            /* look at first char */
                {
                case '\0':                      /* empty string */
                        break;
                case '?':                       /* show some data
*/
                        show_data(&cmd_str[1]);
                        break;
                case '!':                       /* run immediate c
ommand */
                        run_command(&cmd_str[1]);
                        display_string(" ");
                        break;
                default:
                        if( quick_rule(cmd_str, &err) ) /* try to
run it as a rule */
                                display_string("TRUE");
                        else
```

SSU.C

```
                                        display_string(syntax_error_msg(er
r));
                        break;
                }
        strcpy(old_cmd_str, cmd_str);           // save these for
later
        old_str_pos = str_pos;
        str_pos = 0;
        cmd_str[str_pos] = '\0';
        }


int             quick_rule(str, err)
char    *str;
int             *err;
        {
        struct  rule_def        *rptr;

        if( (rptr = xlat_rule(str, err)) != NULL )
                return run_rule(rptr);
        else
                return FALSE;
        }


void run_command(str)
char    *str;
        {
        /* skip leading blanks */
        while( *str == ' ' )
                str++;
        switch( toupper(*str) )
                {
                case 'S':
                        stop_system();
                        break;
                case 'P':
                        go_system();
                        break;
                case 'Y':
                        cycle_system();
                        break;
                case 'L':
                        str++;
                        load_game(str);
                        break;
                case 'X':
                        str++;
                        exit_program(str);
                        break;
                }
```

SSU.C

```
        }

void    run_scene(num, ext, spl)
int             num;
int             ext;
int             spl;
        {
        int             mx, mp;
        int             override = 0;

        if( scene[num].priority == 999 &&
                scene[num].duration == 999 &&
                scene[num].non_repeat == 999 &&
                scene[num].spool_time == 999 )
                {
                load_game(scene[num].id);

                return;
                }
        /* first see if it's OK to run the scene */
        if( scene[num].current_non_repeat )
/* and it has not run too recently */
                override = 1;
        else
                {
                for(mx=0; mx<MAX_OUTPUTS; mx++)

                        {
                        if( scene[num].mix[mx] )        /* if we
have a non-zero cue point */
                                if( mix[mx].priority >= scene[num]
.priority )     /* and the mix is running a higher priority */
                                        {
                                        override = 1;
/* this scene cannot run */
                                        if( !spl )
                                                {
                                                scene[num].current
_spool_time = scene[num].spool_time;  /* but spool for later */
                                                report(num, 0, 2);
                                                }
                                        }
                        }
                }
        if( override )
                return;
        /* send out the commands to the MIX computers */
        scene[num].current_non_repeat = scene[num].non_repeat;
        scene[num].current_spool_time = 0L;
        for(mx=0; mx<MAX_CREATURES; mx++)
```

SSU.C

```
                {
                if( scene[num].mix[mx] > 0 )      /* it's a cue poi
nt */
                        {
                        /* send the string "J#" to the port + 5 */

                        sprintf(bfr, "j%03dO", scene[num].mix[mx])
;
                        send_str(mx, bfr);
                        mix[mx].priority = scene[num].priority;
                        mix[mx].duration = scene[num].duration;
                        }
                else if( scene[num].mix[mx] < 0 )   /* its a text
string */
                        {
                        send_str(mx, scene[num].macro);
                        mix[mx].priority = scene[num].priority;
                        mix[mx].duration = scene[num].duration;
                        }
                }
        for(; mx<MAX_OUTPUTS; mx++)
                {
                mp = mx - MAX_CREATURES;
                if( scene[num].midi[mp] > 0 )
                        {
                        send_midi(mp, scene[num].midi[mp]);
                        mix[mx].priority = scene[num].priority;
                        mix[mx].duration = scene[num].duration;
                        }
                }
        report(num, ext, spl);
        }


void decrement_counters()
        {
        int             mx, c, scn;

        for(mx=0; mx<MAX_OUTPUTS; mx++)
                {
                if( mix[mx].duration )
                        {
                        mix[mx].duration -= 1;
                        if( mix[mx].duration == 0L )
                                mix[mx].priority = LOWEST_PRIORITY
;
                        }
                }
        for(scn=0; scn<scenes; scn++)
                {
                if( scene[scn].current_non_repeat )
```

SSU.C

```
                        scene[scn].current_non_repeat--;
                if( scene[scn].current_spool_time )
                        scene[scn].current_spool_time--;
                }
        memset( exe_scene, 0, scenes*sizeof(int) );
        memset( &Variable[TEMP_OFFSET], 0, (MAX_TEMP_VARS)*sizeof(
int) );
        for(c=0; c<MAX_TIMERS; c++)
                {
                if( Timer[c] )
                        --Timer[c];
                }
        }

void    clear_system()
        {
        int     mx, scn;

        for(mx=0; mx<MAX_OUTPUTS; mx++)
                {
//              if( mx < MAX_CREATURES )
WHY???
//                      send_str(mx, bfr);
                mix[mx].priority = LOWEST_PRIORITY;
                mix[mx].duration = 0L;
                }
        for(scn=0; scn<scenes; scn++)
                {
                scene[scn].current_non_repeat = 0L;
                scene[scn].current_spool_time = 0L;
                }
        }


void stop_system()
        {
        int     mx;

        /* stop all systems */
        sprintf(bfr, "s");
        for(mx=0; mx<MAX_CREATURES; mx++)
                send_str(mx, bfr);
        clear_system();
        report(ALL_STOP, 0, 0);
        }


void go_system()
        {
        int             mx;
```

SSU.C

```
	/* start all systems */
	sprintf(bfr, "p");

	for(mx=0; mx<MAX_CREATURES; mx++)
		send_str(mx, bfr);
	report(ALL_GO, 0, 0);
	}


void cycle_system()
	{
	int		mx;

	/* cycle all systems */
	sprintf(bfr, "j0010");

	for(mx=0; mx<MAX_CREATURES; mx++)
		send_str(mx, bfr);
	clear_system();
	report(ALL_CYCLE, 0, 0);
	}


void	read_states()
	{
	/* read state of all external events, load event[] */
	check_ext_interrupt();
	}


void	test_rules()
	{
	int	r;

	for(r=0; r<num_rules; ++r)
		{
GOTO_RULE:
		run_rule(&rule[r]);
		if( goto_rule )
			{
			r = goto_rule;
			goto_rule = 0;
			goto GOTO_RULE;
			}
		}
	}


void run_scenes()
	{
	int		e;
```

SSU.C

```
        /* if any scenes should be run, execute them now */
        for(e=0; e<scenes; e++)
                {
                if( test_condition( CHANGES_TO, SCENE_BASE+e, 1 )
)       /* triggered */
                        run_scene(e, 0, 0);
                else if( scene[e].current_spool_time )
        /* or spooled */
                        run_scene(e, 0, 1);
                }
        }


int     run_rule(rul)
struct  rule_def        *rul;
        {
        if( test_condition(rul->condition, rul->var1, rul->var2) )
                {
                set_dependent(rul->dependent, rul->operation, rul-
>value);
                return TRUE;
                }
        else
                {
                set_dependent(rul->else_dependent, rul->else_opera
tion, rul->else_value);
                return FALSE;
                }
        }


int     test_condition(condition, var1, var2)
int     condition;
int     var1;
int     var2;
        {
        switch( condition )
                {
                case NOP:
                        return 1;
                        break;
                case EQ:
                        if( get_value var1) == get_value(var2) )
                                return 1;
                        else
                                return 0;
                        break;
                case NE:
                        if( get_value var1) != get_value(var2) )
                                return 1;
```

SSU.C

```
                else
                        return 0;
                break;
        case LT:
                if( get_value(var1) < get_value(var2) )
                        return 1;
                else
                        return 0;
                break;
        case GT:
                if( get_value(var1) > get_value(var2) )
                        return 1;
                else
                        return 0;
                break;
        case AND:
                if( get_value(var1) && get_value(var2) )
                        return 1;
                else
                        return 0;
                break;
        case OR:
                if( get_value(var1) || get_value(var2) )
                        return 1;
                else
                        return 0;
                break;
        case CHANGES_TO:
                if( (get_value(PREVIOUS(var1)) != get_valu
e(var2)) &&
                        (get_value(var1) == get_value(var2
)) )
                                return 1;
                else
                                return 0;
                break;
        default:
                return 0;
        }
}


void    set_dependent(dependent, operation, value)
int             dependent;
int             operation;
int             value;
        {
        if( !dependent )     /* else clause may not exist */
                return;
        switch( operation )
                {
```

SSU.C

```
                case SET:
                        set_value(dependent, get_value(value));
                        break;
                case ADD:
                        set_value(dependent, get_value(value) + ge
t_value(dependent));
                        break;
                case SUBTRACT:
                        set_value(dependent, get_value(value) - ge
t_value(dependent));
                        break;
                case POINTER:
                        set_value(dependent, value);
                        break;
                case ALL_SET:                   // only runs when
rule file is loading
                        break;
                default:
                        return;
                        break;
                }
        }


int     get_value(var)
int     var;
        {
        int             previous = 0;
        int             ind;

        if( var & PREV_BIT )
                previous = 1;
        var &= PREV_BIT - 1;
        if( var < EVENT_BASE )                  /* no previous val
ue for constants */
                return var;
        else if ( var < VARIABLE_BASE
                {
                if( previous )
                        return prev_event[var-EVENT_BASE];
                else
                return event[var-EVENT_BASE];
            }
        else if( var < TIMER_BASE )
                {
                if( previous )
                        return prev_variable[var-VARIABLE_BASE];
                else
                        return Variable[var-VARIABLE_BASE];
                }
        else if( var < SCENE_BASE)
```

SSU.C

```
		{
		if( previous )
			return prev_timer[var-TIMER_BASE];
		else
			return Timer[var-TIMER_BASE];
		}
	else if( var < PRIORITY_BASE )
		{
		if( previous )
			return prev_run_scene[var-SCENE_BASE];
		else
			return exe_scene[var-SCENE_BASE];
		}
	else if( var < DURATION_BASE )
		{
		ind = var - PRIORITY_BASE;
		if( previous )
			return mix[ind].prev_priority;
		else
			return mix[ind].priority;
		}
	else if( var < LABEL_BASE )
		{
		ind = var - DURATION_BASE;
		if( previous )
			return (int)mix[ind].prev_duration;
		else
			return (int)mix[ind].duration;
		}
	else if( var == CLOCK_VAR )
		{
		return time_in_minutes();
		}
	else if( var == DAY_VAR )
		{
		return day_of_week();
		}
	else			/* only labels are left */
		error_msg("bad var in get_value()");
	return 0;
	}


int	get_index(var)		// return index of variable within it
s range
int	var;
	{
	var &= PREV_BIT - 1;
	if( var < EVENT_BASE )				/* no previous val
ue for constants */
		return var;
```

SSU.C

```
        else if ( var < VARIABLE_BASE )
                {
                return var-EVENT_BASE;
            }
        else if( var < TIMER_BASE )
                {
                return var-VARIABLE_BASE;
                }
        else if( var < SCENE_BASE)
                {
                return var-TIMER_BASE;
                }
        else if( var < PRIORITY_BASE
                {
                return var-SCENE_BASE;
                }
        else if( var < DURATION_BASE
                {
                return var - PRIORITY_BASE;
                }
        else if( var < LABEL_BASE )
                {
                return var - DURATION_BASE;
                }
        else                    /* only labels are left */
                error_msg("bad var in get_index()");
        return 0;
        }


int     get_array_size(var)
int     var;
        {
        var &= PREV_BIT - 1;
        if( var < EVENT_BASE )
                return 0;                       // return 0 to not set
 these
        else if ( var < VARIABLE_BASE )
                {
                return 0;
            }
        else if( var < TIMER_BASE )
                {
                return MAX_VARS;
                }
        else if( var < SCENE_BASE)
                {
                return MAX_TIMERS;                      // return 0 t
o not set these
                }
        else if( var < PRIORITY_BASE
```

SSU.C

```
                {
                return 0;                       // return 0 to not set
these
                }
        else if( var < DURATION_BASE )
                {
                return MAX_OUTPUTS;
                }
        else if( var < LABEL_BASE )
                {
                return MAX_OUTPUTS;
                }
        else                    /* only labels are left */
                error_msg("bad var in get_index()");
        return 0;
        }


#pragma warning( disable : 4756 )

void    set_value(var, value)
int             var, value;
        {
        int             ind;

        if( var < EVENT_BASE )
                error_msg("Can't set integers, set_value()");
        else if ( var < VARIABLE_BASE )
                event[var-EVENT_BASE] = value;
        else if( var < TIMER_BASE )
                Variable[var-VARIABLE_BASE] = value;
        else if( var < SCENE_BASE )
                Timer[var-TIMER_BASE] = value;
        else if( var < PRIORITY_BASE
                exe_scene[var-SCENE_BASE] = value;
        else if( var < DURATION_BASE
                {
                ind = var - PRIORITY_BASE;
                mix[ind].priority = value;
                }
        else if( var < NON_REPEAT_BASE )
                {
                ind = var - DURATION_BASE;
                mix[ind].duration = value;
                }
        else if( var < LABEL_BASE )
                {
                ind = var - NON_REPEAT_BASE;
                scene[ind].non_repeat = value;
                }
        else if( var < REAL_TIME_BASE )
```

SSU.C

```
                {
                /* index field is unused for labels */
                for(ind=0; ind<num_labels; ind++)          /* find
matching rule for label value */
                        {
                        if( label[ind].number == value )
                                {
                                goto_rule = label[ind].rule;     /*
 and log rule number to goto */
                                break;
                                }
                        }
                }
        else if( var < MAX_BASE )
                {
                ind = var - REAL_TIME_BASE;
                real_time[ind] = value;
                }
        else
                error_msg("bad var index in set_value()");
        }


void    copy_vars()
        {
        memcpy(prev_run_scene, exe_scene, MAX_SCENES*sizeof(int));
        memcpy(prev_variable, Variable, (MAX_VARS+MAX_TEMP_VARS)*s
izeof(int));
        memcpy(prev_timer, Timer, MAX_TIMERS*sizeof(int));
        memcpy(prev_event, event, MAX_EVENTS*sizeof(int));
        /* events must be cleared after logic processes them */
        memset(event, 0, MAX_EVENTS*sizeof(int));
        }


void add_label(lbl, rul)
int     lbl, rul;
        {
        label[num_labels].number = lbl;
        label[num_labels].rule = rul;
        num_labels++;
        }
```

HRTIME.ASM

```
; mnt chg 4
;       hrtime.asm -    Hi Resolution TIMEr for dos
;

; Copyright notice begins here:
;       Copyright (c) 1991 by Thomas A. Roden
;       All Rights Reserved (with one exception).
;       The right to freely distribute this source and any executa
ble code
;       it creates is granted, provided that this copyright notice
 is
;       included in the source.
;
;       It is requested that the author's name (Thomas A. Roden) b
e included
;       in the acknowledgements of any product including this code
, but this
;       request is in no way legally binding.
; Copyright notice ends here:


IO_DELAY_NEEDED equu     1        ; doesn't seem to need recovery ti
me here
PRVT_TICKS_USED equ      1        ; if a private tick count is to be
 used
IRET_IF_RESTORE equ      0        ; if the interrupt flag is to be r
estored
                                  ; with an IRET, or with the window
s suggested
                                  ; method

;
;       io_delay -      delay just a bit
io_delay        macro
if IO_DELAY_NEEDED
        jmp     short $+2
endif   ; IO_DELAY_NEEDED
endm

PIC0_ADDR       equ     020h    ; I/O address of PIC 0
TIMER0          equ     040h    ; I/O address of Timer 0
TIMER_STAT      equ     043h    ; I/O address for status/control o
f timers 0-2

PIC_RIRR        equ     00Ah    ; Read Interrupt Request Register
of a PIC
T0_R_S_C        equ     0C2h    ; Timer 0 Read Status and Count

DOS_GLOBALS     equ     040h    ; segment for 40:xx variables
SYS_TIMER_CNT   equ     06Ch    ; offset for system count
```

HRTIME.ASM

```
.model  large

.code

assume  ds:nothing, es:nothing

if PRVT_TICKS_USED
hrt_ticks       dd      0
old_int8        dd      0

;
;       hrt_isr -       the interrupt service routine for private
tick
;                       counting for the hi-res timer
;
        public  _hrt_isr
_hrt_isr        proc    far

        add     word ptr cs:[hrt_ticks], 1
        adc     word ptr cs:[hrt_ticks-2], 0

        jmp     dword ptr cs:[old_int8]

_hrt_isr        endp
endif   ; PRVT_TICKS_USED

;
;       hrt_clear -     the clear function for the hi-res timer
;
        public  _hrt_clear
_hrt_clear      proc    far

        push    ds              ; save this stuff to avoid bad cra
shes
        push    es              ; save this stuff just to be paran
oid
        push    bx
        push    cx
        push    dx

        xor     ax, ax
        mov     word ptr cs:[hrt_ticks], ax
        mov     word ptr cs:[hrt_ticks-2], ax

        pop     dx
        pop     cx
        pop     bx
        pop     es
        pop     ds

        xor     ax, ax
```

HRTIME.ASM

```
        ret

_hrt_clear      endp

;
;       hrt_open -      the init function for the hi-res timer
;
        public  _hrt_open
_hrt_open       proc    far

        push    ds              ; save this stuff to avoid bad cra
shes
        push    es              ; save this stuff just to be paran
oid
        push    bx
        push    cx
        push    dx

if PRVT_TICKS_USED
        xor     ax, ax
        mov     word ptr cs:[hrt_ticks], ax
        mov     word ptr cs:[hrt_ticks-2], ax

        mov     ax, 03508h      ; get int vector for int8 (irq0)
        int     21h

        mov     word ptr cs:[old_int8], bx
        mov     ax, es
        mov     word ptr cs:[old_int8-2], ax

        mov     dx, seg _hrt_isr
        mov     ds, dx
        mov     dx, offset _hrt_isr
        mov     ax, 02508h      ; set int vector for int8 (irq0)
        int     21h
endif   ; PRVT_TICKS_USED
        pop     dx
        pop     cx
        pop     bx
        pop     es
        pop     ds

        xor     ax, ax

        ret

_hrt_open       endp

;
;       hrt_close -     the un-init function for the hi-res timer
```

HRTIME.ASM

```
;
        public  _hrt_close
_hrt_close      proc    far

        push    ds              ; save this stuff to avoid bad cra
shes
        push    es              ; save this stuff just to be paran
oid
        push    bx
        push    cx
        push    dx
if PRVT_TICKS_USED
        mov     dx, word ptr cs:[old_int8+2]
        mov     ds, dx
        mov     dx, word ptr cs:[old_int8]

        mov     ax, 02508h      ; set int vector for int8 (irq0)
        int     21h
endif   ; PRVT_TICKS_USED
        pop     dx
        pop     cx
        pop     bx
        pop     es
        pop     ds

        xor     ax, ax

        ret

_hrt_close      endp

;
;       hrtime -        the hi-res time reader
;
        public  _hrtime
_hrtime proc    far
if IRET_IF_RESTORE
        pop     bx              ; return ip - to make iret return
frame
        pop     ax              ; return cs
        pushf                   ; flags
        push    ax              ; cs
        push    bx              ; ip
else    ; IRET_IF_RESTORE
        pushf                   ; store flags on stack to check at
 end
endif   ; IRET_IF_RESTORE

        cli                             ; freeze ticker while chec
king
hrt_readhw:
```

HRTIME.ASM

```
        mov     al, T0_R_S_C            ; timer 0 read stat and co
unt
        out     TIMER_STAT, al
        io_delay
        in      al, TIMER0              ; store stat in ch
        mov     ch, al
        io_delay
        in      al, TIMER0              ; store count in bx
        mov     bl, al
        io_delay
        in      al, TIMER0
        mov     bh, al

        io_delay                        ; delay between timer and
pic access

        mov     al, PIC_RIRR
        out     PIC0_ADDR, al
        io_delay
        in      al, PIC0_ADDR

        test    al, 001h                ; check if system time is
stale
        jz      short hrt_timegood
        mov     ax, 0ffffh              ; force max in lower part
        jmp     short hrt_gotlo
hrt_timegood:
        test    ch, 040h
        jnz     short hrt_readhw        ; timer invalid, retry

        mov     ax, bx                  ; move count to more conve
nient reg
        neg     ax                      ; convert to count up
        shl     ch, 1                   ; bash ch to get high bit
of status
                                        ; (output state) into high
 bit of
                                        ; count via carry
        cmc                             ; invert carry to match co
unt negation
        rcr     ax, 1                   ; mode 3 counts down twice
 by twos,
                                        ; first with output high,
then low
hrt_gotlo:
;
;       This would be the place to shift ax down if less resolutio
n
;       but greater range were needed.  The merging with system ti
cks
;       or parallel ticks would have to involve the same shifting.
```

HRTIME.ASM

```
;
if PRVT_TICKS_USED       ; if a parallel tick count is to be used
        mov     dx, word ptr cs:[hrt_ticks]
else    ; PRVT_TICKS_USED
        mov     dx, DOS_GLOBALS
        mov     es, dx
        mov     dx, es:[SYS_TIMER_CNT]  ; add system time
endif   ; PRVT_TICKS_USED

if IRET_IF_RESTORE
        iret
else    ; IRET_IF_RESTORE
        pop     bx                      ; get flags down to restor
e interrupt flag
        test    bx, 0200h               ; was IF set? (jump if no)
        jz      short hrt_if_done
        sti                             ; restore interrupts to ON
hrt_if_done:
        ret
endif   ; IRET_IF_RESTORE

_hrtime endp

end
```

VIDMODE.ASM

```
                TITLE   'Listing C-1'
                NAME    VideoID
                PAGE    55,132

;
; Name:         VidecID
;
;  modified for large model only.
;
;
; Function:     Detects the presence of various video subsystems a
nd associated
;               monitors.
;
; Caller:       Microsoft C:
;
;                       void VideoID(VIDstruct);
;
;                       struct
;                       {
;                         char VideoSubsystem;
;                         char Display;
;                       }
;                               *VIDstruct[2];
;
;               Subsystem ID values:
;                                0  = (none)
;                                1  = MDA
;                                2  = CGA
;                                3  = EGA
;                                4  = MCGA
;                                5  = VGA
;                               80h = HGC
;                               81h = HGC+
;                               82h = Hercules InColor
;
;               Display types:   0  = (none)
;                                1  = MDA-compatible monochrome
;                                2  = CGA-compatible color
;                                3  = EGA-compatible color
;                                4  = PS/2-compatible monochrome
;                                5  = PS/2-compatible color
;
;
;       The values returned in VIDstruct[0].VideoSubsystem and
;       VIDstruct[0].Display indicate the currently active subsyst
em.
;

ARGpVID         EQU     word ptr [bp+4-2]       ; stack frame addr
essing
```

VIDMODE.ASM

```
ARGpVIDds         EQU     word ptr [bp+4+4]       ; stack frame addr
essing


VIDstruct         STRUC                          ; corresponds to C data st
ructure

Video0Type        DB      ?                      ; first subsystem type
Display0Type      DB      ?                      ; display attached to firs
t subsystem

Video1Type        DB      ?                      ; second subsystem type
Display1Type      DB      ?                      ; display attached to seco
nd subsystem

VIDstruct         ENDS


Device0           EQU     word ptr Video0Type[di]
Device1           EQU     word ptr Video1Type[di]


MDA               EQU     1                      ; subsystem types
CGA               EQU     2
EGA               EQU     3
MCGA              EQU     4
VGA               EQU     5
HGC               EQU     80h
HGCPlus           EQU     81h
InColor           EQU     82h

MDADisplay        EQU     1                      ; display types
CGADisplay        EQU     2
EGAColorDisplay   EQU     3
PS2MonoDisplay    EQU     4
PS2ColorDisplay   EQU     5

TRUE              EQU     1
FALSE             EQU     0


DGROUP            GROUP   _DATA

_TEXT             SEGMENT byte public 'CODE'
                  ASSUME  cs:_TEXT,ds:DGROUP

                  PUBLIC  _VideoID
_VideoID          PROC    far

                  push    bp                     ; preserve caller register
s
```

VIDMODE.ASM

```
                mov     bp,sp
                push    si
                push    di

; initialize the data structure that will contain the results

                mov     di,ARGpVID                      ; DS:DI -> start o
f data structure

                mov     Device0,0       ; zero these variables
                mov     Device1,0

; look for the various subsystems using the subroutines whose addr
esses are
;  tabulated in TestSequence; each subroutine sets flags in TestSe
quence
;  to indicate whether subsequent subroutines need to be called

                mov     byte ptr CGAflag,TRUE
                mov     byte ptr EGAflag,TRUE
                mov     byte ptr Monoflag,TRUE

                mov     cx,NumberOfTests
                mov     si,offset DGROUP:TestSequence

L01:            lodsb                   ; AL := flag
                test    al,al
                lodsw                   ; AX := subroutine address
                jz      L02             ; skip subroutine if flag
is false

                push    si
                push    cx
                call    ax              ; call subroutine to detec
t subsystem
                pop     cx
                pop     si

L02:            loop    L01

; determine which subsystem is active

                call    FindActive

                pop     di              ; restore caller registers
 and return
                pop     si
                mov     sp,bp
                pop     bp
                ret
```

VIDMODE.ASM

```
_VideoID        ENDP

;
; FindPS2
;
;       This subroutine uses INT 10H function 1Ah to determine the
 video BIOS
;        Display Combination Code (DCC) for each video subsystem p
resent.
;

FindPS2         PROC    near

                mov     ax,1A00h
                int     10h                 ; call video BIOS for info

                cmp     al,1Ah
                jne     L13                 ; exit if function not sup
ported (i.e.,
                                            ;  no MCGA or VGA in syste
m)

; convert BIOS DCCs into specific subsystems & displays

                mov     cx,bx
                xor     bh,bh               ; BX := DCC for active sub
system

                or      ch,ch
                jz      L11                 ; jump if only one subsyst
em present

                mov     bl,ch               ; BX := inactive DCC
                add     bx,bx
                mov     ax,[bx+offset DGROUP:DCCtable]

                mov     Device1,ax

                mov     bl,cl
                xor     bh,bh               ; BX := active DCC

L11:            add     bx,bx
                mov     ax,[bx+offset DGROUP:DCCtable]

                mov     Device0,ax

; reset flags for subsystems that have been ruled out

                mov     byte ptr CGAflag,FALSE
                mov     byte ptr EGAflag,FALSE
```

VIDMODE.ASM

```
                mov     byte ptr Monoflag,FALSE
                lea     bx,Video0Type[di]  ; if the BIOS reported
an MDA ...
                cmp     byte ptr [bx],MDA
                je      L12
                lea     bx,Video1Type[di]
                cmp     byte ptr [bx],MDA
                jne     L13
L12:            mov     word ptr [bx],0    ; ... Hercules can't be
 ruled out
                mov     byte ptr Monoflag,TRUE
L13:            ret
FindPS2         ENDP

;
; FindEGA
;
; Look for an EGA.  This is done by making a call to an EGA BIOS f
unction
;  which doesn't exist in the default (MDA, CGA) BIOS.

FindEGA         PROC    near            ; Caller:       AH = flags
                                        ; Returns:      AH = flags
                                        ;               Video0Type
 and
                                        ;                Display0T
ype updated
                mov     bl,10h          ; BL := 10h (return EGA in
fo)
                mov     ah,12h          ; AH := INT 10H function n
umber
                int     10h             ; call EGA BIOS for info
                                        ; if EGA BIOS is present,
                                        ;  BL <> 10H
                                        ;  CL = switch setting
                cmp     bl,10h
                je      L22             ; jump if EGA BIOS not pre
sent
                mov     al,cl
                shr     al,1            ; AL := switches/2
                mov     bx,offset DGROUP:EGADisplays
                xlat                    ; determine display type f
rom switches
```

VIDMODE.ASM

```
                mov     ah,al               ; AH := display type
                mov     al,EGA              ; AL := subystem type
                call    FoundDevice

                cmp     ah,MDADisplay
                je      L21                 ; jump if EGA has a monoch
rome display

                mov     CGAflag,FALSE       ; no CGA if EGA has color
display
                jmp     short L22

L21:            mov     Monoflag,FALSE      ; EGA has a mono display,
so MDA and
                                            ;  Hercules are ruled out
L22:            ret

FindEGA         ENDP


;
; FindCGA
;
;       This is done by looking for the CGA's 6845 CRTC at I/O por
t 3D4H.
;

FindCGA         PROC    near                ; Returns:      VIDstruct
updated

                mov     dx,3D4h             ; DX := CRTC address port
                call    Find6845
                jc      L31                 ; jump if not present

                mov     al,CGA
                mov     ah,CGADisplay
                call    FoundDevice

L31:            ret

FindCGA         ENDP


;
; FindMono
;
;       This is done by looking for the MDA's 6845 CRTC at I/O por
t 3B4H.  If
;       a 6845 is found, the subroutine distinguishes between an M
DA
;       and a Hercules adapter by monitoring bit 7 of the CRT Stat
```

VIDMODE.ASM

```
us byte.
;       This bit changes on Hercules adapters but does not change
on an MDA.
;
;       The various Hercules adapters are identified by bits 4 thr
ough 6 of
;       the CRT Status value:
;
;               000b = HGC
;               001b = HGC+
;               101b = InColor card
;

FindMono        PROC    near            ; Returns:      VIDstruct
updated

                mov     dx,3B4h         ; DX := CRTC address port
                call    Find6845
                jc      L44             ; jump if not present

                mov     dl,0BAh         ; DX := 3BAh (status port)
                in      al,dx
                and     al,80h
                mov     ah,al           ; AH := bit 7 (vertical sy
nc on HGC)

                mov     cx,8000h        ; do this 32768 times
L41:            in      al,dx
                and     al,80h          ; isolate bit 7
                cmp     ah,al
                loope   L41             ; wait for bit 7 to change

                jne     L42             ; if bit 7 changed, it's a
 Hercules

                mov     al,MDA          ; if bit 7 didn't change,
it's an MDA
                mov     ah,MDADisplay
                call    FoundDevice
                jmp     short L44

L42:            in      al,dx
                mov     dl,al           ; DL := value from status
port
                and     dl,01110000b    ; mask bits 4 thru 6

                mov     ah,MDADisplay   ; assume it's a monochrome
 display

                mov     al,HGCPlus      ; look for an HGC+
                cmp     dl,00010000b
```

VIDMODE.ASM

```
                je      L43             ; jump if it's an HGC+
                mov     al,HGC          ; look for an InColor card
 or HGC
                cmp     dl,01010000b
                jne     L43             ; jump if it's not an InCo
lor card

                mov     al,InColor      ; it's an InColor card
                mov     ah,EGAColorDisplay

L43:            call    FoundDevice

L44:            ret

FindMono        ENDP


;
; Find6845
;
;       This routine detects the presence of the CRTC on a MDA, CG
A or HGC.
;       The technique is to write and read register 0Fh of the chi
p (cursor
;       low).  If the same value is read as written, assume the ch
ip is
;       present at the specified port addr.
;

Find6845        PROC    near            ; Caller:       DX = port
addr
                                        ; Returns:      cf set if
not present
                mov     al,0Fh
                out     dx,al           ; select 6845 reg 0Fh (Cur
sor Low)
                inc     dx
                in      al,dx           ; AL := current Cursor Low
 value
                mov     ah,al           ; preserve in AH
                mov     al,66h          ; AL := arbitrary value
                out     dx,al           ; try to write to 6845

                mov     cx,100h
L51:            loop    L51             ; wait for 6845 to respond

                in      al,dx
                xchg    ah,al           ; AH := returned value
                                        ; AL := original value
                out     dx,al           ; restore original value
```

VIDMODE.ASM

```
                cmp     ah,66h          ; test whether 6845 respon
ded
                je      L52             ; jump if it did (cf is re
set)

                stc                     ; set carry flag if no 684
5 present

L52:            ret

Find6845        ENDP


;
; FindActive
;
;       This subroutine stores the currently active device as Devi
ce0.  The
;       current video mode determines which subsystem is active.
;

FindActive      PROC    near

                cmp     word ptr Device1,0
                je      L63                     ; exit if only one
 subsystem

                cmp     Video0Type[di],4        ; exit if MCGA or
VGA present
                jge     L63                     ;  (INT 10H functi
on 1AH
                cmp     Video1Type[di],4        ;  already did the
 work)
                jge     L63

                mov     ah,0Fh
                int     10h                     ; AL := current BI
OS video mode

                and     al,7
                cmp     al,7                    ; jump if monochro
me
                je      L61                     ;  (mode 7 or 0Fh)

                cmp     Display0Type[di],MDADisplay
                jne     L63                     ; exit if Display0
 is color
                jmp     short L62

L61:            cmp     Display0Type[di],MDADisplay
```

VIDMODE.ASM

```
                je      L63                     ; exit if Display0
 is monochrome

L62:            mov     ax,Device0              ; make Device0 cur
rently active
                xchg    ax,Device1
                mov     Device0,ax

L63:            ret

FindActive      ENDP


;
; FoundDevice
;
;       This routine updates the list of subsystems.
;

FoundDevice     PROC    near                    ; Caller:     AH =
display #
                                                ;             AL =
subsystem #
                                                ; Destroys:   BX
                lea     bx,Video0Type[di]
                cmp     byte ptr [bx],0
                je      L71                     ; jump if 1st subs
ystem

                lea     bx,Video1Type[di]       ; must be 2nd subs
ystem

L71:            mov     [bx],ax                 ; update list entr
y
                ret

FoundDevice     ENDP

_TEXT           ENDS


_DATA           SEGMENT word public 'DATA'

EGADisplays     DB      CGADisplay       ; 0000b, 0001b  (EGA switc
h values)
                DB      EGAColorDisplay ; 0010b, 0011b
                DB      MDADisplay       ; 0100b, 0101b
                DB      CGADisplay       ; 0110b, 0111b
                DB      EGAColorDisplay ; 1000b, 1001b
                DB      MDADisplay       ; 1010b, 1011b
```

VIDMODE.ASM

```
DCCtable        DB      0,0             ; translate table for INT
10h func 1Ah
                DB      MDA,MDADisplay
                DB      CGA,CGADisplay
                DB      0,0
                DB      EGA,EGAColorDisplay
                DB      EGA,MDADisplay
                DB      0,0
                DB      VGA,PS2MonoDisplay
                DB      VGA,PS2ColorDisplay
                DB      0,0
                DB      MCGA,EGAColorDisplay
                DB      MCGA,PS2MonoDisplay
                DB      MCGA,PS2ColorDisplay

TestSequence    DB      TRUE            ; this list of flags and a
ddresses
                DW      FindPS2         ;  determines the order in
 which this
                                        ;  program looks for the v
arious
EGAflag         DB      ?               ;  subsystems
                DW      FindEGA

CGAflag         DB      ?
                DW      FindCGA

Monoflag        DB      ?
                DW      FindMono

NumberOfTests   EQU     ($-TestSequence)/3

_DATA           ENDS

                END
```

What is claimed is:

1. A behavioral based system for controlling an interactive playground comprising:

a playground environment;

at least one sensor for detecting changes in the playground environment;

at least one signal transmitted from the at least one sensor, the transmitted signal representing the detected changes;

a set of files, including a current rule file, at least one stored rule file, and a scene file comprising a plurality of scenes, at least one system response being associated with each scene;

a system supervisor, coupled to the at least one sensor, for maintaining the set of files, the system supervisor using the current rule file to select a scene from the scene file responsive to the at least one transmitted signal, the system supervisor further selecting a next rule file in response to the at least one transmitted signal; and an output device, coupled to the system supervisor, for transmitting the at least one system response associated with the selected scene to the playground environment.

2. The behavioral based system according to claim 1 wherein a time signal is one transmitted signal.

3. The behavioral based system according to claim 1 wherein a date signal is one transmitted signal.

4. The behavioral based system according to claim 1 wherein a performance signal is one transmitted signal.

5. The behavioral based system according to claim 1 wherein the at least one system response includes an effects control signal and the output device includes an effects computer, the effects control signal driving the effects computer to transmit at least one system response to the interactive environment.

6. The behavioral based environment system according to claim 1 wherein the set of files includes a MIDI file containing at least one system response.

7. The behavioral based environment system according to claim 6 wherein the at least one system response includes a music control signal and the output device includes a music computer.

8. The behavioral based environment system according to claim 7 wherein the at least one system response includes a MIDI control signal and the output device includes a MIDI signal merger.

9. The behavioral based environment system according to claim 1 wherein a bidirectional modem couples the system supervisor with a remote system.

10. A method for controlling an interactive playground comprising:

detecting at least one change in a playground environment;

transmitting at least one signal representative of the change to a system supervisor;

applying a current rule file to the at least one transmitted signal to select a scene responsive to the at least one transmitted signal;

selecting the next rule file in response to the at least one transmitted signal; and transmitting at least one system response associated with the selected scene to an output device of the playground environment.

11. The method for controlling an interactive environment according to claim 1 wherein one of the at least one transmitted signals is a time signal.

12. The method for controlling an interactive environment according to claim 11 wherein one of the at least one transmitted signals is a date signal.

13. The method for controlling an interactive environment according to claim 11 wherein one of the at least one transmitted signals is a performance signal.

14. The method for controlling an interactive environment according to claim 10 wherein the at least one system response includes an effects control signal, and wherein The output device includes an effects computer.

15. The method for controlling an interactive environment according to claim 1 wherein the set of files includes a MIDI file containing a system response.

16. The method for controlling an interactive environment according to claim 10 wherein the at least one system response includes a music control signal, and wherein the output device includes a music computer.

17. The method for controlling an interactive environment according to claim 10 wherein the at least one system response includes a music control signal and the output device includes a music computer.

18. The method for controlling an interactive environment according to claim 10 wherein the at least one system response includes a MIDI control signal and the output device includes a MIDI signal merger.

* * * * *